US011864062B2

(12) United States Patent
Liu et al.

(10) Patent No.: US 11,864,062 B2
(45) Date of Patent: Jan. 2, 2024

(54) FEEDBACK TECHNIQUES FOR MULTICAST AND UNICAST COMMUNICATIONS

(71) Applicant: QUALCOMM Incorporated, San Diego, CA (US)

(72) Inventors: Le Liu, Fremont, CA (US); Wanshi Chen, San Diego, CA (US); Alberto Rico Alvarino, San Diego, CA (US); Kazuki Takeda, Tokyo (JP); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/389,160

(22) Filed: Jul. 29, 2021

(65) Prior Publication Data
US 2023/0037266 A1     Feb. 2, 2023

(51) Int. Cl.
*H04W 4/06*     (2009.01)
*H04L 1/1867*   (2023.01)
(Continued)

(52) U.S. Cl.
CPC ............. *H04W 4/06* (2013.01); *H04L 1/1896* (2013.01); *H04W 72/1263* (2013.01); *H04W 80/02* (2013.01)

(58) Field of Classification Search
CPC ... H04W 4/06; H04W 72/1263; H04W 80/02; H04L 1/1896; H04L 1/1854; H04L 1/1864
See application file for complete search history.

(56) References Cited

U.S. PATENT DOCUMENTS

2021/0111835 A1    4/2021   Khoshnevisan et al.
2021/0376966 A1*  12/2021   Sengupta .............. H04L 1/1829
(Continued)

FOREIGN PATENT DOCUMENTS

WO    2021067753 A1    4/2021
WO    2021076421 A1    4/2021
WO    2021133238 A1    7/2021

OTHER PUBLICATIONS

International Search Report and Written Opinion—PCT/US2022/073944—ISA/EPO—dated Nov. 11, 2022.

*Primary Examiner* — Afshawn M Towfighi
(74) *Attorney, Agent, or Firm* — Holland & Hart LLP

(57) ABSTRACT

Methods, systems, and devices for wireless communications are described in which a user equipment (UE) may receive a feedback configuration for providing feedback for downlink communications from a base station. Based on the feedback configuration, the UE may determine whether one or more feedback processes has a multicast-only configuration for multicast data communications, or a multicast-or-unicast configuration for either multicast data communications or unicast data communications. The UE may decode one or more transmissions associated with the one or more feedback processes based on the multicast-only or multicast-or-unicast configuration, and may determine a feedback codebook based on the multicast-only or multicast-or-unicast configuration of the one or more feedback processes. The UE may monitor for retransmissions of one or more multicast data communications based on the feedback process configuration.

34 Claims, 20 Drawing Sheets

(51) Int. Cl.
*H04W 72/1263* (2023.01)
*H04W 80/02* (2009.01)

(56) References Cited

U.S. PATENT DOCUMENTS

2021/0376967 A1* 12/2021 Ahn .................... H04W 72/21
2021/0410129 A1* 12/2021 Freda ................... H04W 76/18

* cited by examiner

FEEDBACK TECHNIQUES FOR MULTICAST AND UNICAST COMMUNICATIONS

FIELD OF TECHNOLOGY

The following relates to wireless communications, including feedback techniques for multicast and unicast communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may communicate with multiple UEs at once. For example, the base station may use broadcast transmissions or multicast transmissions to convey a same message to the multiple UEs. Rather than specifically configuring the transmissions for each UE, the base station may configure group-common transmissions for the multiple UEs and indicate these configurations to the multiple UEs to enable the multiple UEs to monitor for and receive these group-common transmissions. Efficient techniques are desired to support group-common transmissions.

SUMMARY

The described techniques relate to improved methods, systems, devices, and apparatuses that support feedback techniques for multicast and unicast communications. In various aspects, described techniques provide for a user equipment (UE) to receive a feedback configuration for providing feedback for downlink communications from a base station. Based on the feedback configuration, the UE may determine whether one or more feedback processes (e.g., one or more hybrid automatic repeat request (HARQ) processes) of a set of feedback processes has a multicast-only configuration for multicast communications transmitted from the base station to two or more UEs, or a multicast-or-unicast configuration for either multicast communications or unicast communications transmitted from the base station to the first UE. The UE may decode one or more transmissions associated with the one or more feedback processes based on the multicast-only or multicast-or-unicast configuration. In some cases, the UE may determine a feedback codebook based on the multicast-only or multicast-or-unicast configuration of the one or more feedback processes, and monitor for retransmissions of one or more multicast communications based on the feedback process configuration.

A method for wireless communications at a first user equipment (UE) is described. The method may include receiving, from a base station, a feedback report configuration that indicates, for at least a subset of a set of feedback processes, a type of feedback that is to be reported for each feedback process of the subset of feedback processes, determining, based on the feedback report configuration, whether a first feedback process of the subset of feedback processes has a multicast-only configuration for multicast data communications, or a multicast-or-unicast configuration for either multicast data communications or unicast data communications, and decoding one or more transmissions associated with the first feedback process based on whether the first feedback process has the multicast-only configuration or the multicast-or-unicast configuration.

An apparatus for wireless communications at a first UE is described. The apparatus may include a processor, memory coupled with the processor, and instructions stored in the memory. The instructions may be executable by the processor to cause the apparatus to receive, from a base station, a feedback report configuration that indicates, for at least a subset of a set of feedback processes, a type of feedback that is to be reported for each feedback process of the subset of feedback processes, determine, based on the feedback report configuration, whether a first feedback process of the subset of feedback processes has a multicast-only configuration for multicast data communications, or a multicast-or-unicast configuration for either multicast data communications or unicast data communications, and decode one or more transmissions associated with the first feedback process based on whether the first feedback process has the multicast-only configuration or the multicast-or-unicast configuration.

Another apparatus for wireless communications at a first UE is described. The apparatus may include means for receiving, from a base station, a feedback report configuration that indicates, for at least a subset of a set of feedback processes, a type of feedback that is to be reported for each feedback process of the subset of feedback processes, means for determining, based on the feedback report configuration, whether a first feedback process of the subset of feedback processes has a multicast-only configuration for multicast data communications, or a multicast-or-unicast configuration for either multicast data communications or unicast data communications, and means for decoding one or more transmissions associated with the first feedback process based on whether the first feedback process has the multicast-only configuration or the multicast-or-unicast configuration.

A non-transitory computer-readable medium storing code for wireless communications at a first UE is described. The code may include instructions executable by a processor to receive, from a base station, a feedback report configuration that indicates, for at least a subset of a set of feedback processes, a type of feedback that is to be reported for each feedback process of the subset of feedback processes, determine, based on the feedback report configuration, whether a first feedback process of the subset of feedback processes has a multicast-only configuration for multicast data communications, or a multicast-or-unicast configuration for either multicast data communications or unicast data communications, and decode one or more transmissions associated with the first feedback process based on whether the first feedback process has the multicast-only configuration or the multicast-or-unicast configuration.

In some examples of the method, apparatuses, and non-transitory computer-readable medium described herein, the determining may include operations, features, means, or instructions for determining that the first feedback process has the multicast-only configuration based on the first feedback process being associated with multicast data communications and the feedback report configuration indicating acknowledgment/negative-acknowledgment (ACK/NACK) feedback is to be provided for the first feedback process. Some examples of the method, apparatuses, and non-transitory computer-readable medium described herein may further include operations, features, means, or instructions for receiving, responsive to a NACK feedback provided for the first feedback process, a retransmission of a first multicast data communication associated with the first feedback process in a PTP communication from the base station, where PTP communications for unicast data do not use a feedback process identification associated with the first feedback process.

In some examples of the method, apparatuses, and non-transitory computer-readable medium described herein, the determining may include operations, features, means, or instructions for determining that the first feedback process has the multicast-or-unicast configuration based on the feedback report configuration indicating ACK/NACK feedback is to be provided for the multicast data communications. Some examples of the method, apparatuses, and non-transitory computer-readable medium described herein may further include operations, features, means, or instructions for receiving, subsequent to a NACK feedback provided for the first feedback process for a first multicast data communication, a PTP communication from the base station that is associated with the first feedback process and determining whether the PTP communication is for unicast data or is a retransmission of the first multicast data communication based on control information associated with the PTP communication. In some examples of the method, apparatuses, and non-transitory computer-readable medium described herein, the PTP communication includes a control information field, or may be transmitted in a scheduling window, that indicates whether the PTP communication is the retransmission of the first multicast data communication or for the unicast data transmission.

Some examples of the method, apparatuses, and non-transitory computer-readable medium described herein may further include operations, features, means, or instructions for receiving, from the base station, multicast scheduling information that indicates no-feedback or NACK-only feedback is to be provided for multicast data transmissions, and where the subset of feedback processes have a multicast-or-unicast configuration based on the no-feedback or NACK-only feedback for the multicast data transmissions. In some examples of the method, apparatuses, and non-transitory computer-readable medium described herein, a PTP transmission between the base station and the first UE cannot be used for a retransmission of a first multicast data transmission when no-feedback or NACK-only feedback is to be provided for the multicast data transmissions.

In some examples of the method, apparatuses, and non-transitory computer-readable medium described herein, a same feedback process identification as used for a first multicast data transmission in a PTM transmission may be included in scheduling information for a unicast data transmission in a PTP transmission from the base station. In some examples of the method, apparatuses, and non-transitory computer-readable medium described herein, the feedback report configuration may be received in one or more of radio resource control signaling, a medium access control (MAC) control element, a group common downlink control information (GC-DCI), or any combinations thereof, as an explicit indication of a multicast feedback configuration that indicates whether each feedback process of at least the subset of feedback processes is configured for ACK/NACK feedback, NACK-only feedback, or may have feedback disabled. In some examples of the method, apparatuses, and non-transitory computer-readable medium described herein, the feedback report configuration may be determined based on an implicit indication provided by a feedback timing value associated with the multicast data communications, a control channel resource indicator value for providing the feedback report associated with the multicast data communications, a radio network temporary identifier (RNTI) associated with control information that schedules the multicast data communications, or any combinations thereof.

Some examples of the method, apparatuses, and non-transitory computer-readable medium described herein may further include operations, features, means, or instructions for transmitting a feedback report to the base station that includes a feedback codebook, where the feedback codebook includes a set of bits that are associated with a set of multiple reception candidate occasions and where, when the subset of feedback processes have ACK/NACK feedback configured for multicast data communications, each reception candidate occasion of the set of multiple reception candidate occasions is included in the feedback codebook. In some examples of the method, apparatuses, and non-transitory computer-readable medium described herein, the feedback report includes a feedback codebook that includes a set of bits that are associated with a set of multiple reception candidate occasions and where, when the subset of feedback processes have the multicast-or-unicast configuration and feedback for the multicast data communications is disabled or is negative-acknowledgment-only (NACK-only), the feedback codebook includes bits for one or more of the set of multiple reception candidate occasions based on a type of feedback codebook that is configured for providing the feedback report.

Some examples of the method, apparatuses, and non-transitory computer-readable medium described herein may further include operations, features, means, or instructions for transmitting, to the base station, a capability indication that indicates one or more of a first capability to receive a dynamic indication to include feedback information for the multicast data communications in a feedback report or a second capability adjust a feedback codebook size based on whether feedback for the multicast data communications is enabled or disabled.

A method for wireless communications at a base station is described. The method may include transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications, transmitting a first multicast data communication to the first UE and at least one or more other UEs, the first multicast data communication associated with a first feedback process of the subset of feedback processes, and receiving, from the first UE, a feedback report based on the feedback configuration.

An apparatus for wireless communications at a base station is described. The apparatus may include a processor, memory coupled with the processor, and instructions stored in the memory. The instructions may be executable by the processor to cause the apparatus to transmit, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications, transmit a first multicast data communication to the first UE and at least one or more other UEs, the first multicast data communication associated with a first feedback process of the subset of feedback processes, and receive, from the first UE, a feedback report based on the feedback configuration.

Another apparatus for wireless communications at a base station is described. The apparatus may include means for transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications, means for transmitting a first multicast data communication to the first UE and at least one or more other UEs, the first multicast data communication associated with a first feedback process of the subset of feedback processes, and means for receiving, from the first UE, a feedback report based on the feedback configuration.

A non-transitory computer-readable medium storing code for wireless communications at a base station is described. The code may include instructions executable by a processor to transmit, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications, transmit a first multicast data communication to the first UE and at least one or more other UEs, the first multicast data communication associated with a first feedback process of the subset of feedback processes, and receive, from the first UE, a feedback report based on the feedback configuration.

Some examples of the method, apparatuses, and non-transitory computer-readable medium described herein may further include operations, features, means, or instructions for transmitting multicast scheduling information that indicates ACK/NACK feedback is to be provided for the multicast data communications, and where the feedback configuration further indicates that the subset of feedback processes have a multicast-only configuration, and transmitting, responsive the feedback report including a NACK indication for the first feedback process, a retransmission of the first multicast data communication, where the retransmission is transmitted in a PTP transmission from the base station to the first UE that indicates a first feedback process identification that is associated with the first feedback process.

Some examples of the method, apparatuses, and non-transitory computer-readable medium described herein may further include operations, features, means, or instructions for transmitting multicast scheduling information that indicates ACK/NACK feedback is to be provided for the multicast data communications, and where the feedback configuration further indicates that the subset of feedback processes have a multicast-or-unicast configuration. Some examples of the method, apparatuses, and non-transitory computer-readable medium described herein may further include operations, features, means, or instructions for transmitting, responsive the feedback report including a NACK indication for the first feedback process, a retransmission of the first multicast data communication, where the retransmission is transmitted in a PTP transmission from the base station to the first UE that indicates a first feedback process identification that is associated with the first feedback process, and where the PTP transmission further indicates whether the retransmission is associated with a multicast data transmission or a unicast data transmission. In some examples of the method, apparatuses, and non-transitory computer-readable medium described herein, the PTP transmission includes a control information field, or is transmitted in a scheduling window, that indicates whether the retransmission is associated with a multicast data transmission or a unicast data transmission.

Some examples of the method, apparatuses, and non-transitory computer-readable medium described herein may further include operations, features, means, or instructions for transmitting multicast scheduling information that indicates no-feedback or NACK-only feedback is to be provided for the multicast data communications, and where the subset of feedback processes have a multicast-or-unicast configuration based on the no-feedback or NACK-only feedback for the multicast data communications. In some examples of the method, apparatuses, and non-transitory computer-readable medium described herein, the feedback configuration may be transmitted in one or more of RRC signaling, a MAC control element, a GC-DCI, or any combinations thereof, as an explicit indication of the multicast-only configuration or the multicast-or-unicast configuration for each feedback process of at least the subset of feedback processes. In some examples of the method, apparatuses, and non-transitory computer-readable medium described herein, the feedback configuration may be based on an implicit indication provided by a feedback timing value, a control channel resource indicator value for providing the feedback report, a RNTI associated with control information that schedules the first multicast data communication, or any combinations thereof.

In some examples of the method, apparatuses, and non-transitory computer-readable medium described herein, the feedback report includes a feedback codebook that includes a set of bits that are associated with a set of multiple reception candidate occasions and where, when the subset of feedback processes have the multicast-only configuration, each reception candidate occasion of the set of multiple reception candidate occasions is included in the feedback codebook. In some examples of the method, apparatuses, and non-transitory computer-readable medium described herein, the feedback report includes a feedback codebook that includes a set of bits that are associated with a set of multiple reception candidate occasions and where, when the subset of feedback processes have the multicast-or-unicast configuration and feedback for the multicast data communications is disabled or is NACK-only, the feedback codebook includes bits for one or more of the set of multiple reception candidate occasions based on a type of feedback codebook that is configured for providing the feedback report.

DETAILED DESCRIPTION

Figure 1:
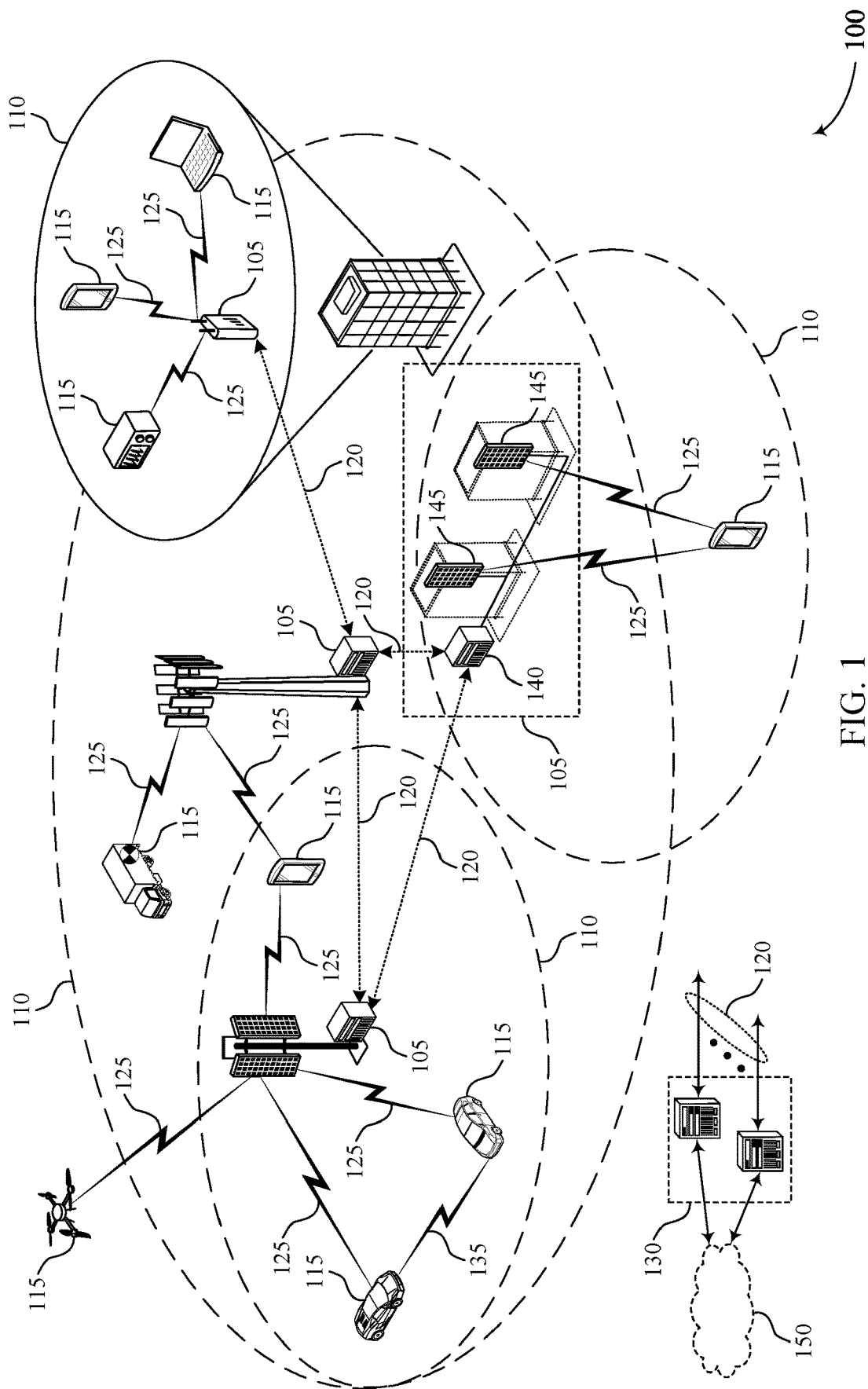
FIG. 1 illustrates an example of a wireless communications system that supports feedback techniques for multicast and unicast communications in accordance with aspects of the present disclosure.

Multicast transmissions (also referred to as point-to-multipoint (PTM) transmissions) from a base station to one user equipment (UE) or multiple UEs may be configured with feedback process IDs (e.g., hybrid automatic repeat request (HARQ) process IDs) that allow a UE to transmit feedback to indicate successful/unsuccessful reception of the multicast transmission (e.g., with an acknowledgment/negative-acknowledgement (ACK/NACK) indication). In some cases, a total number of configured feedback process IDs may remain unchanged irrespective of whether the feedback process IDs are to be used for unicast data communications (e.g., point-to-point (PTP) communications between a base station and one UE) or multicast data communications. The unicast data communication is via point-to-point (PTP) communications between a base station and one UE; while the multicast data communication can be via point-to-multipoint (PTM) communications between a base station and two or more UEs, or PTP retransmission of a multicast data for a PTM initial transmission. Various aspects as discussed herein allow a base station flexibility to use a same feedback process ID for both unicast and multicast communications. In some cases, techniques as discussed herein may allow a UE to determine whether a feedback process can be used for a multicast transport block (TB) only (multicast-only configuration) or used for mixed multicast TB or unicast TB (multicast-or-unicast configuration). Such a determination may be used to determine a payload of a feedback codebook used to provide feedback information to a base station. The multicast data communication may include the multicast service data and related radio resource control (RRC) signaling transmitted via PTM group-common physical downlink shared channel (PDSCH) or PTP PDSCH. The unicast data communication may include the unicast service data and related RRC signaling transmitted via PTP PDSCH.

In some cases, a UE may receive a feedback configuration for providing feedback for downlink communications from a base station. Based on the feedback configuration, the UE may determine whether one or more feedback processes of a set of feedback processes has a multicast-only configuration for multicast data communications, or a multicast-or-unicast configuration for either multicast data communications or unicast data communications. The UE may decode one or more transmissions associated with the one or more feedback processes, based on the multicast-only or multicast-or-unicast configuration. In some cases, the UE may determine a feedback codebook based on the multicast-only or multicast-or-unicast configuration of the one or more feedback processes, and monitor for retransmissions of one or more multicast communications based on the feedback process configuration. In some cases, retransmissions of either unicast or multicast data communications may be transmitted using PTP communications, and the UE may decode the retransmissions based on the feedback configuration. In some cases, a UE may determine a feedback codebook for reporting ACK/NACK feedback based on rules for whether to include feedback for downlink transmission occasions in the codebook or not (e.g., based on a feedback codebook type).

In some cases, if a feedback report configuration for PTM communications indicates that a feedback report for multicast data communications is to provide NACK-only feedback or no feedback for associated feedback processes, feedback processes scheduled with a unicast resource allocation may be used for initial transmissions and retransmissions of unicast data, and feedback processes scheduled with a multicast resource allocation may be used for initial transmissions and retransmissions of multicast data.

In other cases, a feedback report configuration for PTM communications may indicate that a feedback report for multicast data communications is to provide ACK/NACK feedback. In such cases, a feedback process scheduled for PTM communications with a multicast resource allocation may be also used for retransmissions of multicast data via unicast transmissions with a unicast resource allocation. In some cases, a feedback process may not be used to schedule the PTP initial and retransmission of unicast data (i.e., the feedback process is for multicast-only). Alternatively, a feedback process scheduled for PTM communications with a multicast resource allocation may be used for either PTP initial transmissions and retransmissions of unicast data or for PTP retransmissions of multicast data, and additional signaling may indicate whether the feedback process scheduled for PTP communication is for unicast data or a retransmission of multicast data (i.e., the feedback process is for multicast-or-unicast). In some cases, whether to configure the PTP transmission/retransmission for unicast data using the same feedback process as that of a PTP retransmission of multicast data may be based on UE capability. For example, if the UE cannot support the capability to share the same feedback process for multicast data and unicast data, the UE is not expected to be scheduled to receive the PTP for unicast data using the same feedback process as that of multicast data. However, if the UE can support this capability, the base station may enable the operation and indicate the UE (e.g., by RRC signaling or MAC-CE), to monitor a DCI scheduling the PTP communication, which includes a field to indicate the scheduled PTP is the transmission/retransmission for unicast data or a retransmission of multicast data.

Aspects of the disclosure are initially described in the context of wireless communications systems. Additionally, aspects of the disclosure are illustrated through an additional wireless communications system, multiplexing configurations, and a process flow. Aspects of the disclosure are further illustrated by and described with reference to apparatus diagrams, system diagrams, and flowcharts that relate to feedback techniques for multicast and unicast communications.

FIG. 1 illustrates an example of a wireless communications system 100 that supports feedback techniques for multicast and unicast communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may communicate with multiple UEs 115 at once. For example, the base station 105 may use broadcast transmissions or multicast transmissions to convey a same message to the multiple UEs 115. Rather than specifically configuring the transmissions for each UE 115, the base station 105 may configure group-common transmissions for the multiple UEs 115 and may indicate these configurations to the multiple UEs 115 to enable the multiple UEs 115 to monitor for and receive these group-common transmissions. The base station 105 may indicate resource grants using a group-common downlink control information (GC-DCI) (e.g., DCI that is scrambled with a group radio network temporary identifier (G-RNTI), where UEs 115 configured with the G-RNTI may identify the GC-DCI as indicating resources for a multicast communication).

The GC-DCI may indicate one or more feedback processes (e.g., HARQ process IDs) that are associated with the multicast communication (e.g., a group common physical downlink shared channel (GC-PDSCH) communication). In some cases, a UE 115 may determine whether a feedback process is for multicast-only or multicast-or-unicast, based at least in part on a feedback report configuration for PTM communications. In some cases, the feedback report configuration may indicate that ACK/NACK feedback is to be provided for feedback processes associated with the GC-PDSCH, that NACK-only feedback is to be provided, or that no feedback is to be provided.

In cases where NACK-only or no feedback is to be provided, a feedback process that is indicated in scheduling information for a unicast transmission (e.g., a PTP communication that is scheduled in a PDCCH scrambled with a cell RNTI (C-RNTI) of a UE 115) may be used for initial and re-transmissions of unicast data, and a feedback process that is indicated in scheduling information for a multicast transmission (e.g., a PTM communication that is scheduled in a GC-PDCCH with G-RNTI) may be used for initial and re-transmissions of multicast data (e.g., an initial transmission in a PTM transmission and a re-transmission in a PTP transmission).

In other cases, ACK/NACK feedback may be configured. In one alternative for such a configuration, a feedback process scheduled by PTP (e.g., PDCCH with C-RNTI) that indicates a feedback process that may be associated with a multicast resource allocation may only be used for retransmissions of multicast data. In another alternative for such a configuration, a feedback process scheduled by PTP (e.g., PDCCH with C-RNTI) may be used for either initial transmissions and retransmissions of unicast data or for retransmissions of multicast data, and additional signaling may indicate whether a PTP transmission that indicates the feedback process is for unicast data (initial or re-transmission) or a retransmission of multicast data.

Figure 2:
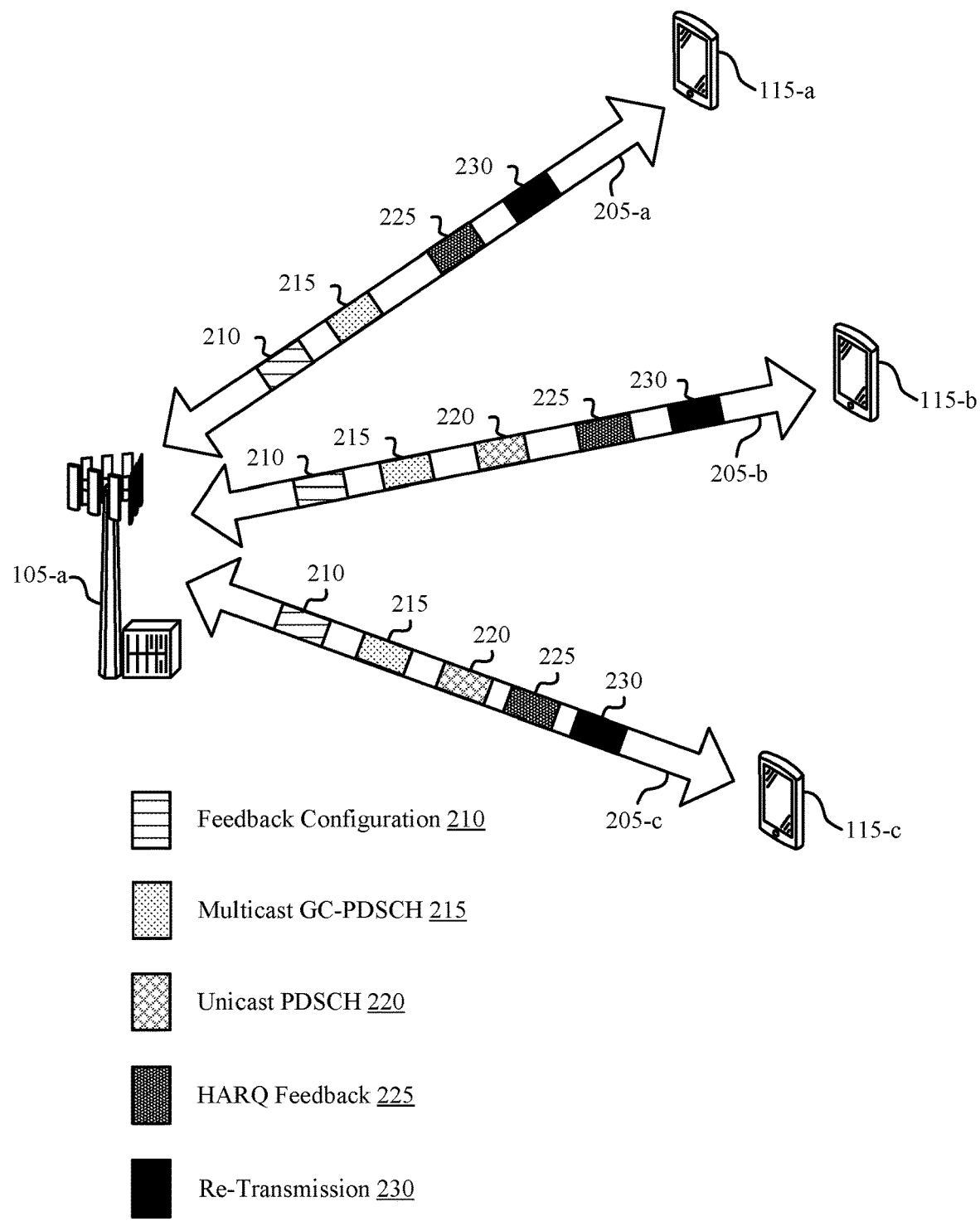
FIG. 2 illustrates an example of a portion of a wireless communications system that supports feedback techniques for multicast and unicast communications in accordance with aspects of the present disclosure.

FIG. 2 illustrates an example of a wireless communications system 200 that supports feedback techniques for multicast and unicast communications in accordance with aspects of the present disclosure. In some examples, wireless communications system 200 may implement aspects of or may be implemented by aspects of wireless communications system 100. For example, wireless communications system 200 may include a base station 105-a, a first UE 115-a, a second UE 115-b, and a third UE 115-c, which may be examples of base stations 105 and UEs 115, respectively, as described with reference to FIG. 1.

Additionally, the UEs 115 may be subscribed to an MBS group to receive multicast or broadcast communications from base station 105-a. In some cases, base station 105-a may communicate control signaling, data, or both with a UE 115 via a communication link 205 (e.g., for the multicast communications), and each UE 115 may communicate control signaling, data, or both with base station 105-a via the corresponding communication link 205. For example, first UE 115-a may communicate with base station 105-a via a first communication link 205-a, second UE 115-b may communicate with base station 105-a via a second communication link 205-b, and third UE 115-c may communicate with base station 105-a via a third communication link 205-c. Base station 105-a may communicate with each UE 115 via broadcast services (e.g., a single message broadcasted out such that any UE 115 can receive it) or via multicast services (e.g., respective messages transmitted to each UE 115 subscribed to the MBS group). Multicast PTM communications may be transmitted in multicast GC-PDSCH 215, and such communications may refer to any one-to-many transmission of the base station 105-a or another UE (e.g., in sidelink communications). Unicast PTP transmissions may be transmitted in unicast PDSCH 220. HARQ feedback 225 may be provided for unicast PTP transmissions, multicast PTM transmissions, or both.

As described herein, base station 105-a may transmit feedback configurations 210 to each UE 115 to indicate how each UE 115 is to provide feedback for PTM downlink shared channels (e.g., group-common PDSCHs, etc.). For example, base station 105-a may transmit a feedback configuration 210 to the UEs 115 (e.g., via communication links 205). Accordingly, each UE 115 may use the feedback configuration 210 to determine whether a HARQ process is for multicast only, or multicast-or-unicast, based at least in part on the feedback configuration 210 (e.g., ACK/NACK, NACK-only or no feedback).

In some cases, the base station 105-a may configure a feedback process (e.g., a HARQ process ID) to be used for multicast only or multicast/unicast. In some cases, a feedback process used for multicast GC-PDSCH transmission 215 may be configured to have ACK/NACK-based feedback (e.g., based on feedback configuration 210). In some cases, such a feedback process may be used for multicast only (i.e., for multicast data transmissions only). The base station 105-a, in such cases, may only use PTP for multicast retransmission 230 (e.g., a PTP transmission may be used to retransmit a TB initially transmitted using PTM, which may be indicated by the corresponding HARQ process ID), and the base station 105-a may not use PTP for unicast transmissions for the associated feedback process ID.

In other cases where the feedback process used for multicast GC-PDSCH transmission 215 may be configured to have ACK/NACK-based feedback, the associated feedback processes may be used for multicast/unicast (i.e., for multicast or unicast data transmissions). In such cases, the base station 105-a may use the same feedback process for PTP for multicast retransmission (e.g., PTP retransmission 230 of an initial transmission of multicast GC-PDSCH 215) or for PTP for unicast initial transmissions or retransmission (e.g., unicast PDSCH 220 or PTP retransmission 230 of a unicast PDSCH 220). In order to differentiate between PTP for multicast retransmission or PTP for unicast transmission/retransmission, control signaling may be provided. In some cases, an additional field may be provided in PTP DCI (e.g., DCI with C-RNTI) to differentiate a new data indicator (NDI) of PTP for multicast retransmission or PTP for unicast transmission/retransmission. In other cases, separate scheduling windows may be configured (e.g., time division multiplexed (TDM'ed)) to differentiate the PTP for multicast retransmission or PTP for unicast, with each scheduling window associated with PTP for multicast retransmission only or PTP for unicast transmission/retransmission only.

In further cases, the feedback configuration 210 may indicate that a feedback process used for a multicast GC-PDSCH 215 transmission is configured to disable feedback or to have NACK-only-based feedback, such a feedback process may be used for multicast data and unicast data transmissions or retransmissions. In such cases, the base station 105-a may not schedule PTP for multicast retransmission due to lack of UE-specific ACK/NACK, and the base station 105-a may schedule PTP for unicast data initial and retransmission using the same feedback process.

As discussed, the feedback configuration 210 may be used to determine whether a feedback process is for multicast-only or multicast-or-unicast. In some cases, the feedback configuration (e.g., ACK/NACK feedback for PTM, NACK-only for PTM, or no feedback for PTM) may be explicitly configured by unicast RRC signaling or in a medium access control (MAC) control element (CE) that indicates one or more feedback processes with disabled HARQ feedback, or one or more feedback processes with enabled HARQ feedback that can be ACK/NACK-based feedback or NACK-only-based feedback. In other cases, the feedback configuration may be explicitly configured by PTM DCI (e.g., GC-DCI with G-RNTI) that indicates one or more feedback processes with disabled HARQ feedback, or one or more feedback processes with enabled HARQ feedback that can be ACK/NACK-based feedback or NACK-only-based feedback.

Alternatively, feedback configuration may be implicitly configured by an offset value (e.g., a K1 value) indicated in GC-DCI, that indicates an offset between a multicast GC-PDSCH 215 and the HARQ feedback 225. For PTM communication, multiple entries for K1 field in GC-DCI can be configured by RRC signaling and one of the candidate values may be indicated by GC-DCI. In such cases, feedback processes may have disabled HARQ feedback when a non-numerical K1 is indicated, or feedback processes may have enabled HARQ feedback when numerical K1 is indicated, which may be ACK/NACK-based feedback or NACK-only-based feedback.

In further cases, feedback process configuration may be based on a PUCCH resource indicated in GC-PDCCH. For PTM communication, multiple entries for PUCCH resource indicator (PRI) field in GC-DCI can be configured by RRC signaling and one of the entries may be indicated by GC-DCI. In such cases, feedback processes may have disabled HARQ feedback when no PUCCH resource is indicated by a PUCCH resource indicator (PRI), or feedback processes may have enabled HARQ feedback when a PUCCH resource is indicated by the PRI. When HARQ feedback is enabled, the PUCCH resource may be configured for ACK/NACK-based feedback, or NACK-only-based feedback.

In still further cases, feedback process configuration may be based on the G-RNTI used for GC-PDCCH. In such cases, feedback processes may have disabled HARQ feedback when the G-RNTI is configured to disable HARQ feedback (e.g., in RRC configuration). Feedback processes may have enabled HARQ feedback when the G-RNTI is configured to have HARQ feedback, in which the G-RNTI may be configured to have ACK/NACK-based feedback, or NACK-only-based feedback.

In some cases, the UEs 115 may transmit HARQ feedback 225 in a feedback codebook. In cases where a feedback process is used for multicast PTM transmissions only (e.g., multicast PTM with ACK/NACK-based feedback), PDSCH reception candidate occasions for multicast PTM may always be counted for inclusion in the codebook (e.g., for type-1/2/3 HARQ-ACK feedback codebook).

In other cases, a feedback process may be used for multicast PTM transmissions or unicast PTP transmissions, where multicast PTM may have feedback disabled or NACK-only-based feedback and unicast PTP has HARQ ACK/NACK-based feedback. In some cases, PDSCH reception candidate occasions for unicast (PTP) may be counted and the PDSCH reception candidate occasions for multicast PTM may or may not be counted for inclusion in the feedback codebook, based on a type of feedback codebook that is configured (e.g., a Type-1 codebook that may be a fixed-size codebook, a Type-2 codebook that may have a dynamic size based on a resource allocation, and a Type-3 codebook that may be used to provide one-shot feedback for HARQ process IDs). In some cases, for a Type-1 codebook, the PDSCH reception candidate occasions for multicast PTM may be counted for inclusion in the codebook only when HARQ feedback is enabled (e.g., when HARQ feedback is semi-statically enabled), or may be counted regardless of whether HARQ feedback is enabled or disabled, and NACK (or ACK) is inserted for the occasion with feedback disabled (e.g., when HARQ feedback is dynamically enabled/disabled). For a Type-2 codebook, the PDSCH reception occasions for multicast PTM may be counted when HARQ feedback is enabled, and a downlink assignment index (DAI) for multicast only counts the multicast GC-PDSCH with enabled HARQ feedback and is not incremented for disabled HARQ feedback. For a Type-3 codebook, the PDSCH reception occasions for multicast PTM may only be counted when the feedback process for multicast has enabled feedback and feedback is NACK.

In some cases, whether the HARQ feedback can be enabled/disabled dynamically by DCI may be based on a capability of the UEs. If a UE can support dynamic enabling/disabling HARQ feedback, the UE will follow the indication of the field in GC-DCI for dynamic enabling/disabling HARQ feedback. If a UE cannot support dynamic enabling/disabling HARQ feedback, the UE may ignore the field in GC-DCI for dynamic enabling/disabling HARQ feedback. In such case, the default behavior for the UE to receive multicast data may be predefined as enabled HARQ feedback, disabled HARQ feedback, or configured to be enabled or disabled HARQ feedback per HARQ process by RRC signaling. In some cases, UEs 115 may indicate a UE capability to the base station 105-a (e.g., as part of a connection establishment, or based on a request from the base station 105-a to indicate capability). In some cases, UEs 115 may indicate a UE capability to the core network (e.g., to the access and mobility management function as part of registration or MBS subscription, or based on a request from core network to indicate capability). UEs 115 that indicate a capability for feedback processes that can be configured for multicast only or multicast-or-unicast may be enabled for such operation by the base station 105-a. In some cases, the feedback codebook size may be reduced based on whether one or more feedback processes have feedback disabled, and such a codebook size reduction may also be based on UE 115 capability.

Figure 3:
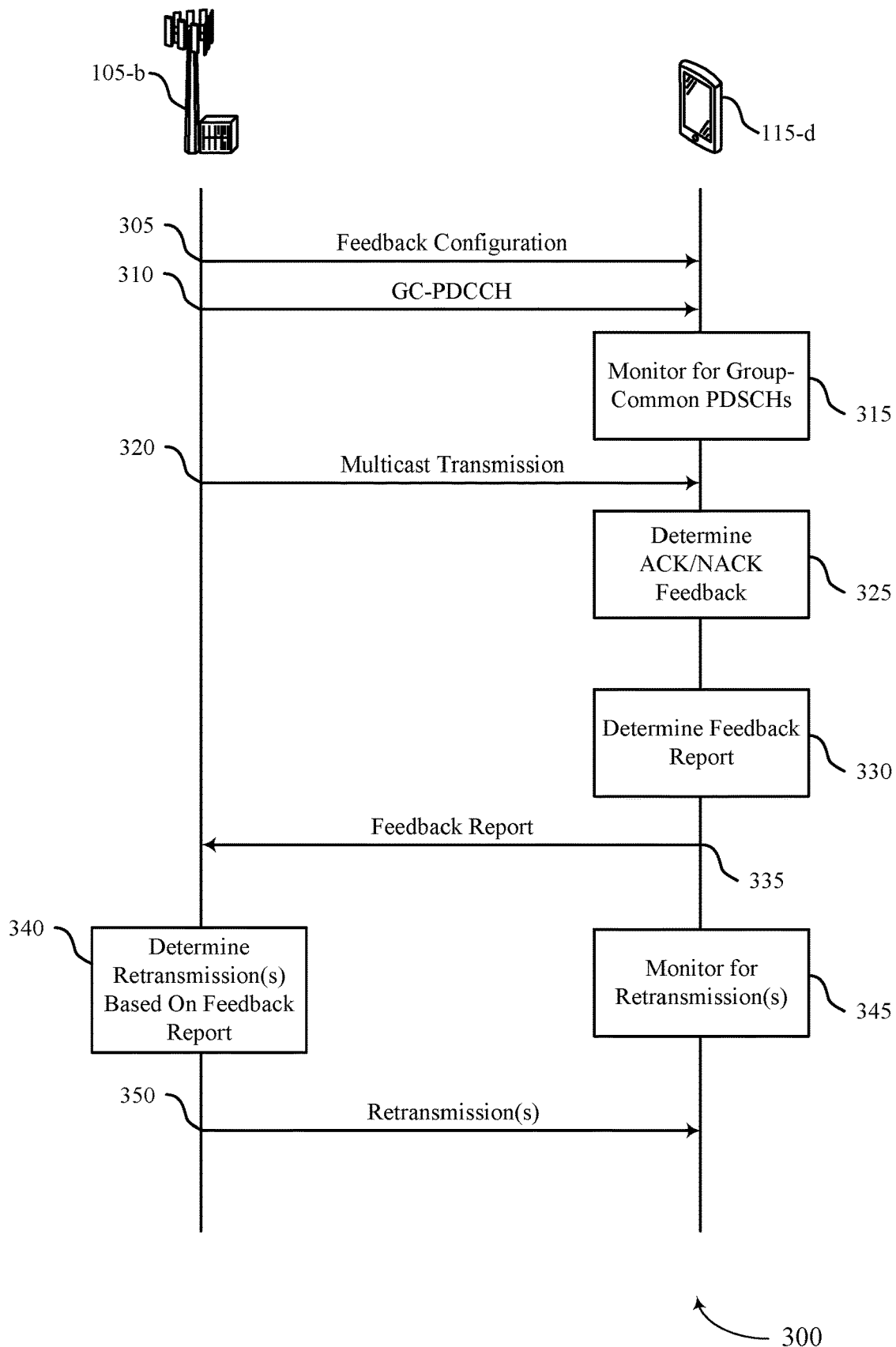
FIG. 3 illustrates an example of a process flow that supports feedback techniques for multicast and unicast communications in accordance with aspects of the present disclosure.

FIG. 3 illustrates an example of a process flow 300 that supports feedback techniques for multicast and unicast communications in accordance with aspects of the present disclosure. In some examples, process flow 300 may implement aspects of or may be implemented by aspects of wireless communications system 100, wireless communications system 200, or both. For example, process flow 300 may include a base station 105-b and a UE 115-d, which may represent examples of corresponding base stations 105 and UEs 115, respectively, as described with reference to FIGS. 1-2.

In the following description of process flow 300, the operations between UE 115-d and base station 105-b may be performed in different orders or at different times. Certain operations may also be left out of process flow 300, or other operations may be added to process flow 300. It is to be understood that while UE 115-d and base station 105-b are shown performing a number of the operations of process flow 300, any wireless device may perform the operations shown.

At 305, UE 115-d may receive, from base station 105-b, a feedback configuration for providing feedback for multicast PDSCH transmissions. The feedback configuration, as discussed herein, may indicate that a feedback process (e.g., a HARQ process ID) is configured for ACK/NACK feedback, for NACK-only feedback, or for no feedback. In some cases, the feedback configuration may be received in RRC signaling, in a MAC-CE, or in DCI (e.g., GC-DCI). In other cases, the feedback configuration for feedback processes may be determined based on an offset value between a GC-PDSCH and ACK/NACK feedback transmission, based on a PUCCH resource indicated in GC-PDCCH, or may be dependent on the G-RNTI used for the GC-PDCCH.

At 310, the base station 105-b may transmit a GC-PDCCH that may include GC-DCI that indicates GC-PDSCH resources. The UE 115-d may decode the GC-DCI based on its G-RNTI, for example. At 315, UE 115-d may monitor for group-common downlink shared channels based on the GC-DCI. At 320, the base station 105-b may transmit a multicast PTM transmission to multiple UEs.

At 325, the UE 115-d may determine ACK/NACK feedback for one or more feedback processes associated with the GC-PDSCH. The ACK/NACK feedback may be determined based on the feedback configuration (e.g., ACK/NACK, NACK-only, no feedback). At 330, the UE 115-d may determine a feedback report based on the determined ACK/NACK feedback and the feedback configuration, and at 335 may transmit the feedback report to the base station 105-b. The feedback report may include a codebook of feedback information (e.g., ACK/NACK for each reported HARQ process ID that is associated with the codebook).

At 340, the base station 105-b may determine whether one or more retransmissions are to be transmitted based on the feedback report. In some cases, the base station 105-b may determine one or more retransmissions are to be transmitted and may, based on the feedback configuration, allocate PTP resources for retransmission of one or more GC-PDSCH TBs. At 345, the UE 115-d may monitor for retransmissions via PTP based on the feedback configuration, in accordance with techniques such as discussed herein. At 350, the base station 105-b may transmit the one or more retransmissions, and the UE 115-d may receive and decode the retransmissions.

Figure 4:
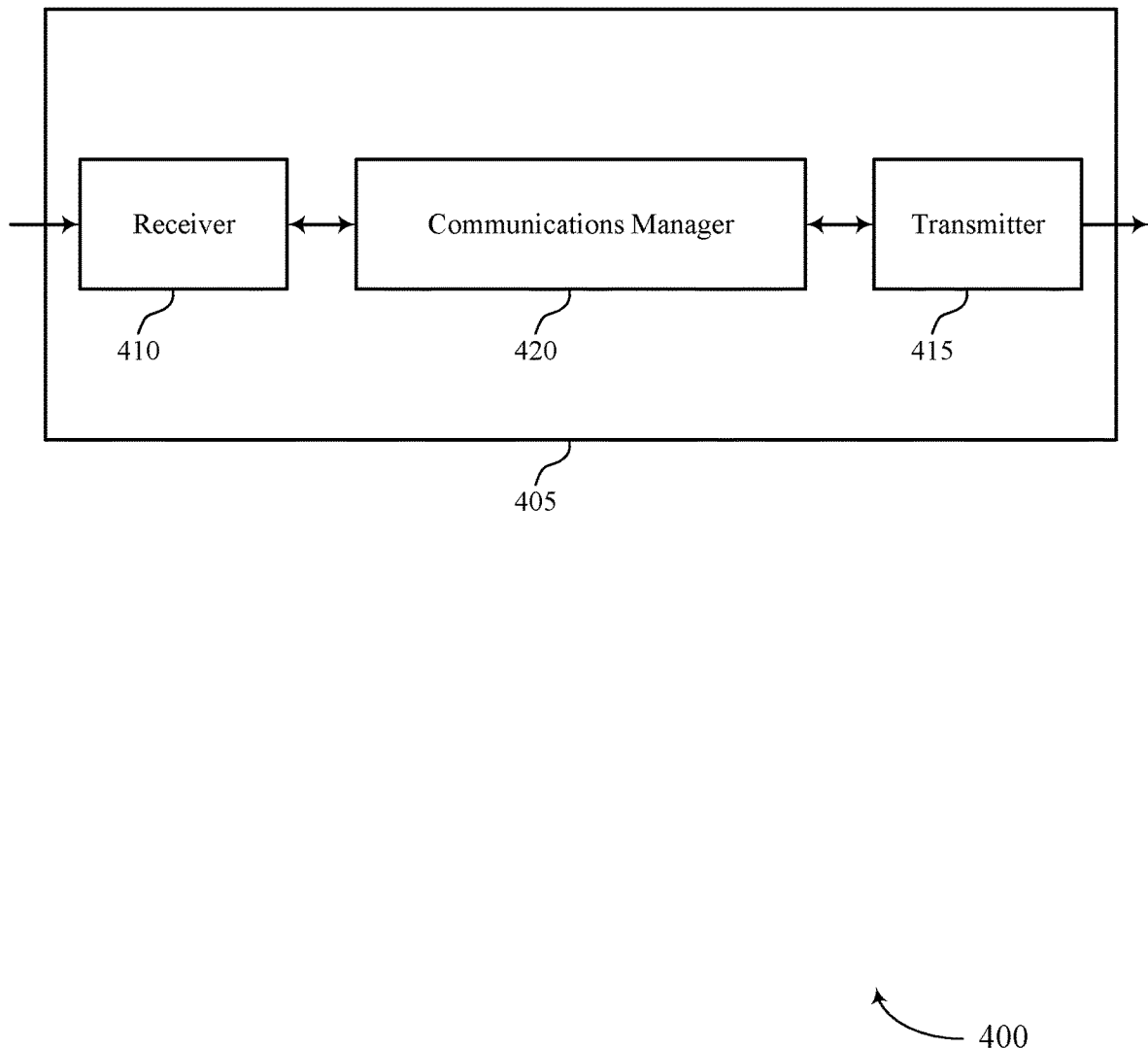
FIGS. 4 and 5 show block diagrams of devices that support feedback techniques for multicast and unicast communications in accordance with aspects of the present disclosure.

FIG. 4 shows a block diagram 400 of a device 405 that supports feedback techniques for multicast and unicast communications in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to feedback techniques for multicast and unicast communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to feedback techniques for multicast and unicast communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of feedback techniques for multicast and unicast communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first UE in accordance with examples as disclosed herein. For example, the communications manager 420 may be configured as or otherwise support a means for receiving, from a base station, a feedback report configuration that indicates, for at least a subset of a set of feedback processes, a type of feedback that is to be reported for each feedback process of the subset of feedback processes. The communications manager 420 may be configured as or otherwise support a means for determining, based on the feedback report configuration, whether a first feedback process of the subset of feedback processes has a multicast-only configuration for multicast data communications, or a multicast-or-unicast configuration for either multicast data communications or unicast data communications. The communications manager 420 may be configured as or otherwise support a means for decoding one or more transmissions associated with the first feedback process based on whether the first feedback process has the multicast-only configuration or the multicast-or-unicast configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for multicast and unicast feedback that may use a shared set of feedback processes, which may provide for more efficient utilization of communication resources through flexibility in feedback process allocation to different types of communications. Such techniques may allow for more efficient assignment of feedback processes, which may allow for enhanced communications throughput based on a mix of PTP and PTM traffic that is present.

Figure 5:
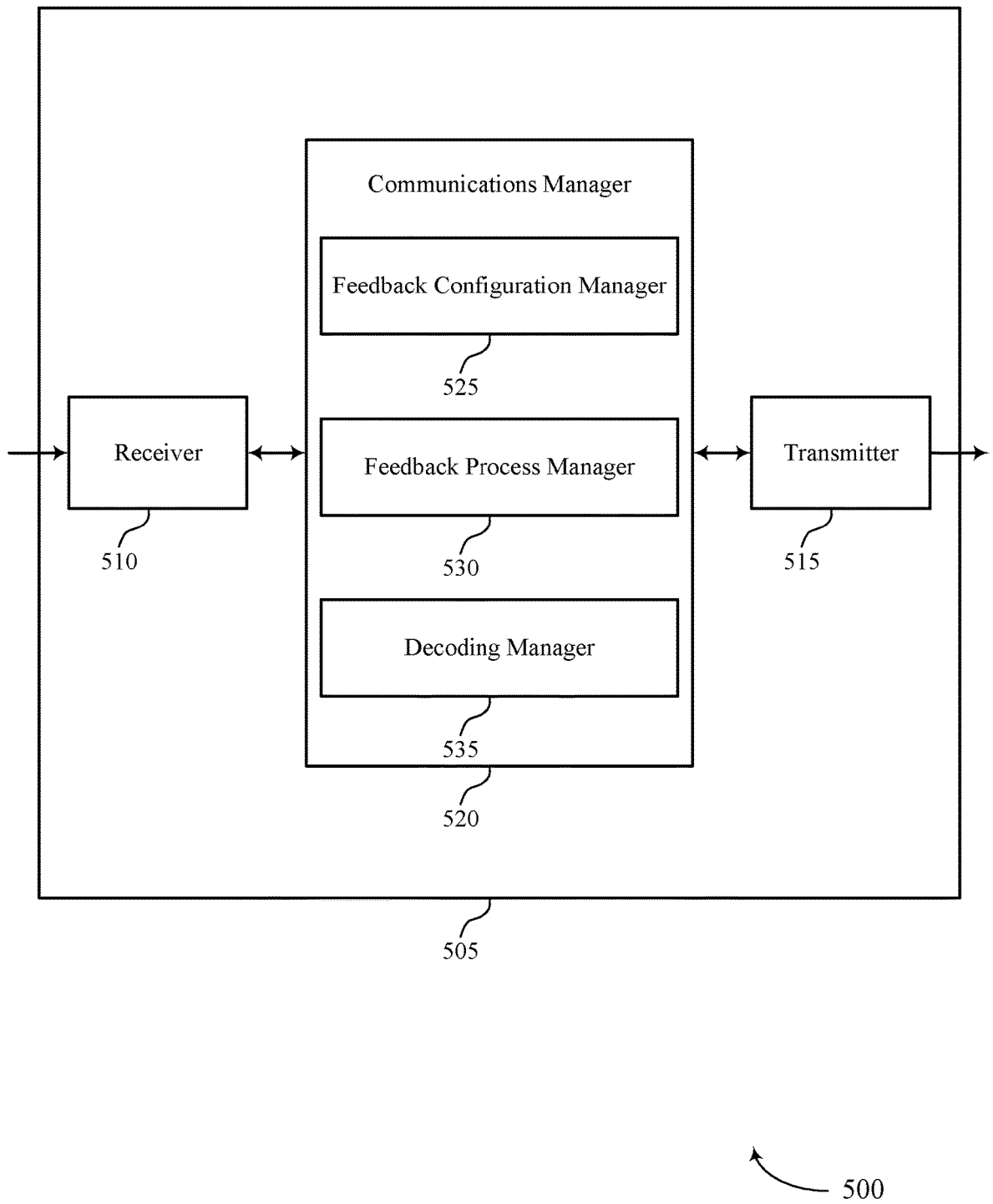

FIG. 5 shows a block diagram 500 of a device 505 that supports feedback techniques for multicast and unicast communications in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback techniques for multicast and unicast communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback techniques for multicast and unicast communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of feedback techniques for multicast and unicast communications as described herein. For example, the communications manager 520 may include a feedback configuration manager 525, a feedback process manager 530, a decoding manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. The feedback configuration manager 525 may be configured as or otherwise support a means for receiving, from a base station, a feedback report configuration that indicates, for at least a subset of a set of feedback processes, a type of feedback that is to be reported for each feedback process of the subset of feedback processes. The feedback process manager 530 may be configured as or otherwise support a means for determining, based on the feedback report configuration, whether a first feedback process of the subset of feedback processes has a multicast-only configuration for multicast data communications, or a multicast-or-unicast configuration for either multicast data communications or unicast data communications. The decoding manager 535 may be configured as or otherwise support a means for decoding one or more transmissions associated with the first feedback process based on whether the first feedback process has the multicast-only configuration or the multicast-or-unicast configuration.

Figure 6:
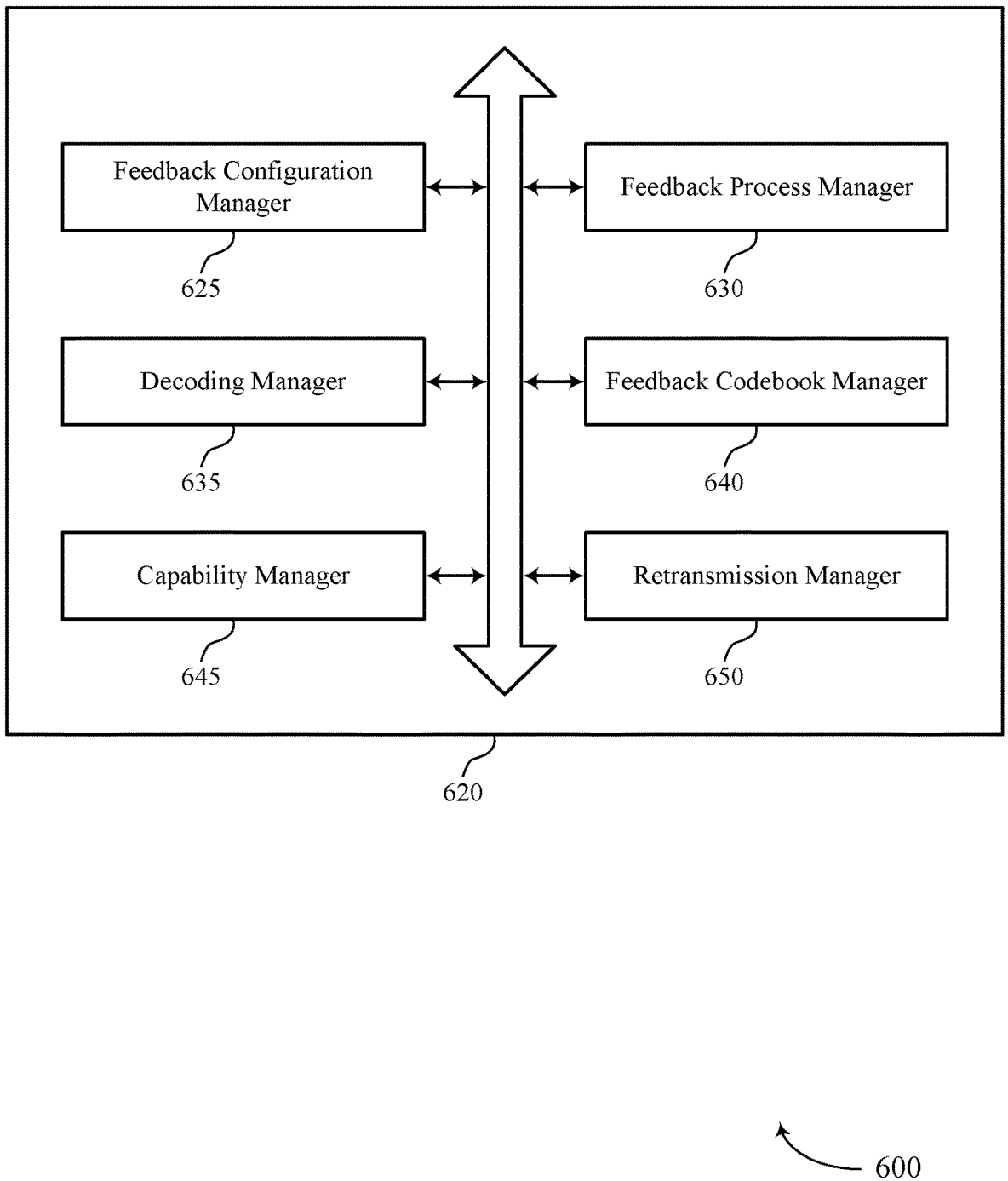
FIG. 6 shows a block diagram of a communications manager that supports feedback techniques for multicast and unicast communications in accordance with aspects of the present disclosure.

FIG. 6 shows a block diagram 600 of a communications manager 620 that supports feedback techniques for multicast and unicast communications in accordance with aspects of the present disclosure. The communications manager 620 may be an example of aspects of a communications manager 420, a communications manager 520, or both, as described herein. The communications manager 620, or various components thereof, may be an example of means for performing various aspects of feedback techniques for multicast and unicast communications as described herein. For example, the communications manager 620 may include a feedback configuration manager 625, a feedback process manager 630, a decoding manager 635, a feedback codebook manager 640, a capability manager 645, a retransmission manager 650, or any combination thereof. Each of these components may communicate, directly or indirectly, with one another (e.g., via one or more buses).

The communications manager 620 may support wireless communications at a first UE in accordance with examples as disclosed herein. The feedback configuration manager 625 may be configured as or otherwise support a means for receiving, from a base station, a feedback report configuration that indicates, for at least a subset of a set of feedback processes, a type of feedback that is to be reported for each feedback process of the subset of feedback processes. The feedback process manager 630 may be configured as or otherwise support a means for determining, based on the feedback report configuration, whether a first feedback process of the subset of feedback processes has a multicast-only configuration for multicast data communications, or a mul-ticast-or-unicast configuration for either multicast data communications or unicast data communications. The decoding manager 635 may be configured as or otherwise support a means for decoding one or more transmissions associated with the first feedback process based on whether the first feedback process has the multicast-only configuration or the multicast-or-unicast configuration.

In some examples, to support determining, the feedback process manager 630 may be configured as or otherwise support a means for determining that the first feedback process has the multicast-only configuration based on the first feedback process being associated with multicast data communications and the feedback report configuration indicating ACK/NACK feedback is to be provided for the first feedback process.

In some examples, the retransmission manager 650 may be configured as or otherwise support a means for receiving, responsive to a NACK feedback provided for the first feedback process, a retransmission of a first multicast data communication associated with the first feedback process in a PTP communication from the base station, where PTP communications for unicast data do not use a feedback process identification associated with the first feedback process.

In some examples, to support determining, the feedback process manager 630 may be configured as or otherwise support a means for determining that the first feedback process has the multicast-or-unicast configuration based on the feedback report configuration indicating ACK/NACK feedback is to be provided for the multicast data communications.

In some examples, the retransmission manager 650 may be configured as or otherwise support a means for receiving, subsequent to a NACK feedback provided for the first feedback process for a first multicast data communication, a PTP communication from the base station that is associated with the first feedback process. In some examples, the retransmission manager 650 may be configured as or otherwise support a means for determining whether the PTP communication is for unicast data or is a retransmission of the first multicast data communication based on control information associated with the PTP communication. In some examples, the PTP communication includes a control information field, or is transmitted in a scheduling window, that indicates whether the PTP communication is the retransmission of the first multicast data communication or for the unicast data transmission.

In some examples, the feedback process manager 630 may be configured as or otherwise support a means for receiving, from the base station, multicast scheduling information that indicates no-feedback or NACK-only feedback is to be provided for multicast data transmissions, and where the subset of feedback processes have a multicast-or-unicast configuration based on the no-feedback or NACK-only feedback for the multicast data transmissions. In some examples, a PTP transmission between the base station and the first UE cannot be used for a retransmission of a first multicast data transmission when no-feedback or NACK-only feedback is to be provided for the multicast data transmissions. In some examples, a same feedback process identification as used for a first multicast data transmission in a PTM transmission is included in scheduling information for a unicast data transmission in a PTP transmission from the base station.

In some examples, the feedback report configuration is received in one or more of radio resource control signaling, a MAC-CE, a GC-DCI, or any combinations thereof, as an explicit indication of a multicast feedback configuration that indicates whether each feedback process of at least the subset of feedback processes is configured for ACK/NACK feedback, NACK-only feedback, or has feedback disabled. In some examples, the feedback report configuration is determined based on an implicit indication provided by a feedback timing value associated with the multicast data communications, a control channel resource indicator value for providing the feedback report associated with the multicast data communications, a RNTI associated with control information that schedules the multicast data communications, or any combinations thereof.

In some examples, the feedback codebook manager 640 may be configured as or otherwise support a means for transmitting a feedback report to the base station that includes a feedback codebook, where the feedback codebook includes a set of bits that are associated with a set of multiple reception candidate occasions and where, when the subset of feedback processes have ACK/NACK feedback configured for multicast data communications, each reception candidate occasion of the set of multiple reception candidate occasions is included in the feedback codebook. In some examples, the feedback report includes a feedback codebook that includes a set of bits that are associated with a set of multiple reception candidate occasions and where, when the subset of feedback processes have the multicast-or-unicast configuration and feedback for the multicast data communications are disabled or are NACK-only, the feedback codebook includes bits for one or more of the set of multiple reception candidate occasions based on a type of feedback codebook that is configured for providing the feedback report.

In some examples, the capability manager 645 may be configured as or otherwise support a means for transmitting, to the base station, a capability indication that indicates one or more of a first capability to receive a dynamic indication to include feedback information for the multicast data communications in a feedback report or a second capability adjust a feedback codebook size based on whether feedback for the multicast data communications is enabled or disabled.

Figure 7:
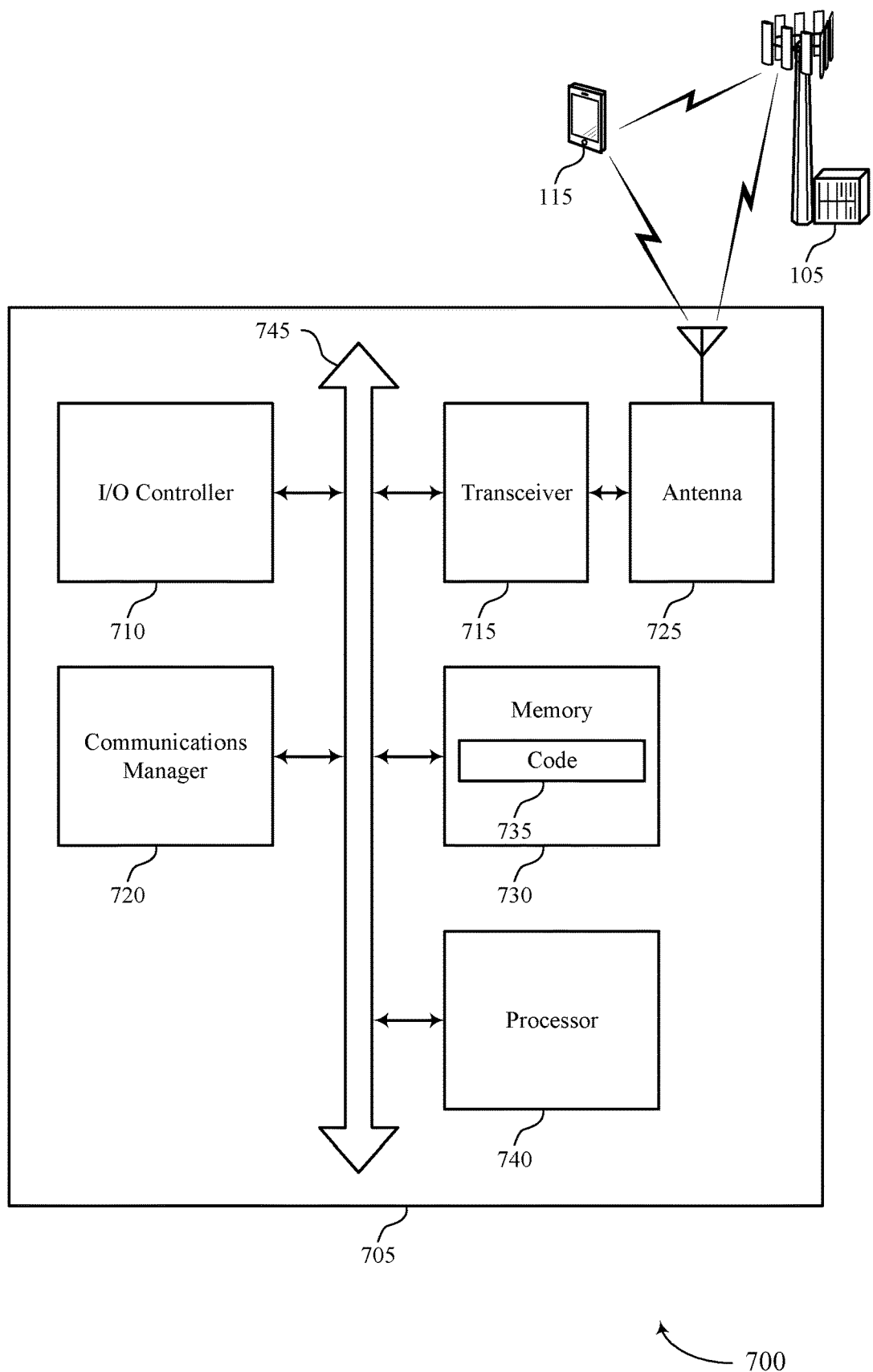
FIG. 7 shows a diagram of a system including a device that supports feedback techniques for multicast and unicast communications in accordance with aspects of the present disclosure.

FIG. 7 shows a diagram of a system 700 including a device 705 that supports feedback techniques for multicast and unicast communications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting feedback techniques for multicast and unicast communications). For example, the device 705 or a component of the device 705 may include a processor 740 and memory 730 coupled to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for receiving, from a base station, a feedback report configuration that indicates, for at least a subset of a set of feedback processes, a type of feedback that is to be reported for each feedback process of the subset of feedback processes. The communications manager 720 may be configured as or otherwise support a means for determining, based on the feedback report configuration, whether a first feedback process of the subset of feedback processes has a multicast-only configuration for multicast data communications, or a multicast-or-unicast configuration for either multicast data communications or unicast data communications. The communications manager 720 may be configured as or otherwise support a means for decoding one or more transmissions associated with the first feedback process based on whether the first feedback process has the multicast-only configuration or the multicast-or-unicast configuration.

By including or configuring the communications manager 720 in accordance with examples as described herein, the device 705 may support techniques for multicast and unicast feedback that may use a shared set of feedback processes, which may provide for more efficient utilization of communication resources through flexibility in feedback process allocation to different types of communications. Such techniques may allow for more efficient assignment of feedback processes, which may allow for enhanced communications throughput based on a mix of PTP and PTM traffic that is present.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of feedback techniques for multicast and unicast communications as described herein, or the processor 740 and the memory 730 may be otherwise configured to perform or support such operations.

Figure 8:
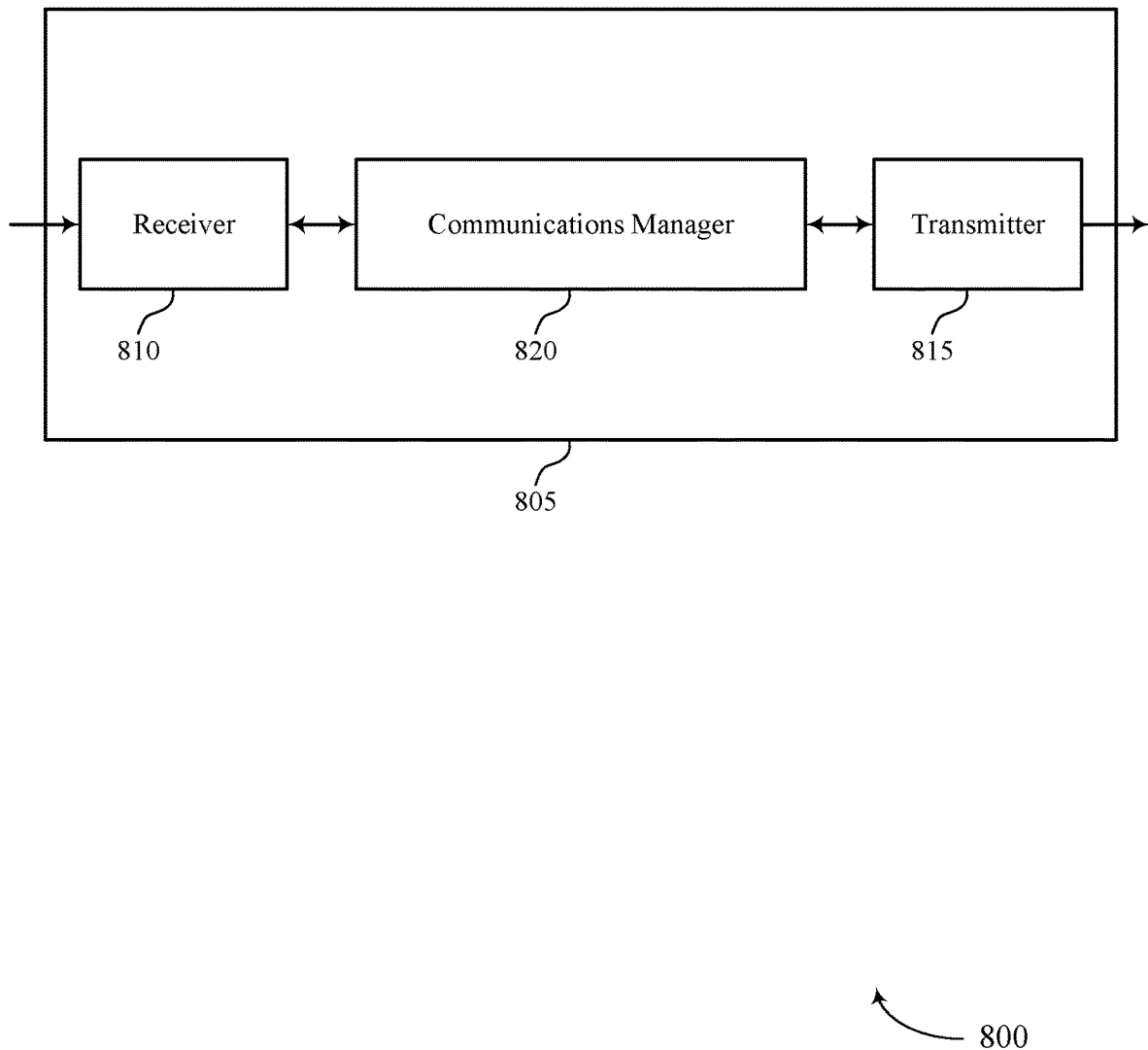
FIGS. 8 and 9 show block diagrams of devices that support feedback techniques for multicast and unicast communications in accordance with aspects of the present disclosure.

FIG. 8 shows a block diagram 800 of a device 805 that supports feedback techniques for multicast and unicast communications in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to feedback techniques for multicast and unicast communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to feedback techniques for multicast and unicast communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of feedback techniques for multicast and unicast communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The communications manager 820 may be configured as or otherwise support a means for transmitting a first multicast data communication to the first UE and at least one or more other UEs, the first multicast data communication associated with a first feedback process of the subset of feedback processes. The communications manager 820 may be configured as or otherwise support a means for receiving, from the first UE, a feedback report based on the feedback configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for multicast and unicast feedback that may use a shared set of feedback processes, which may provide for more efficient utilization of communication resources through flexibility in feedback process allocation to different types of communications. Such techniques may allow for more efficient assignment of feedback processes, which may allow for enhanced communications throughput based on a mix of PTP and PTM traffic that is present.

Figure 9:
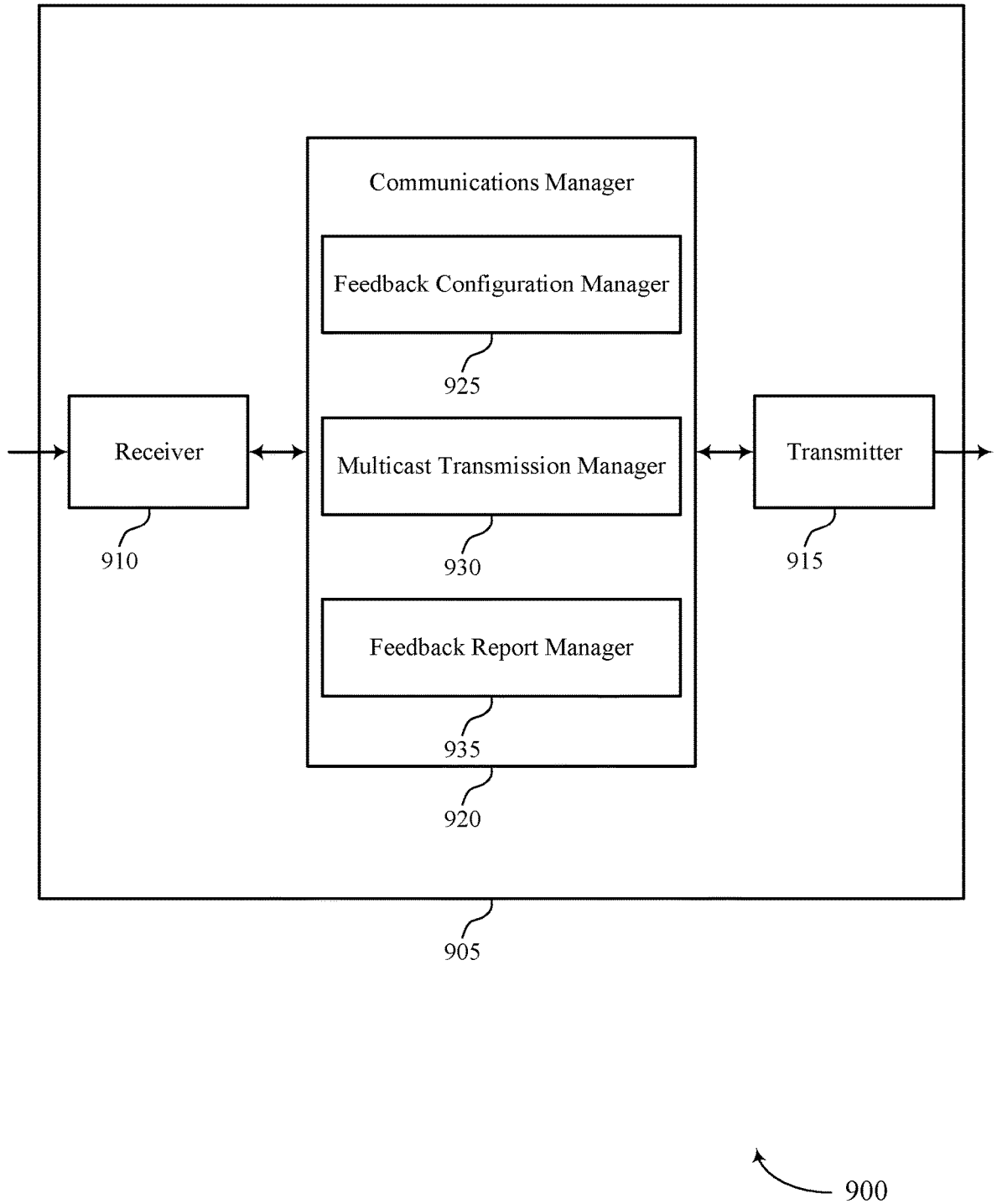

FIG. 9 shows a block diagram 900 of a device 905 that supports feedback techniques for multicast and unicast communications in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback techniques for multicast and unicast communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback techniques for multicast and unicast communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of feedback techniques for multicast and unicast communications as described herein. For example, the communications manager 920 may include a feedback configuration manager 925, a multicast transmission manager 930, a feedback report manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The feedback configuration manager 925 may be configured as or otherwise support a means for transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The multicast transmission manager 930 may be configured as or otherwise support a means for transmitting a first multicast data communication to the first UE and at least one or more other UEs, the first multicast data communication associated with a first feedback process of the subset of feedback processes. The feedback report manager 935 may be configured as or otherwise support a means for receiving, from the first UE, a feedback report based on the feedback configuration.

Figure 10:
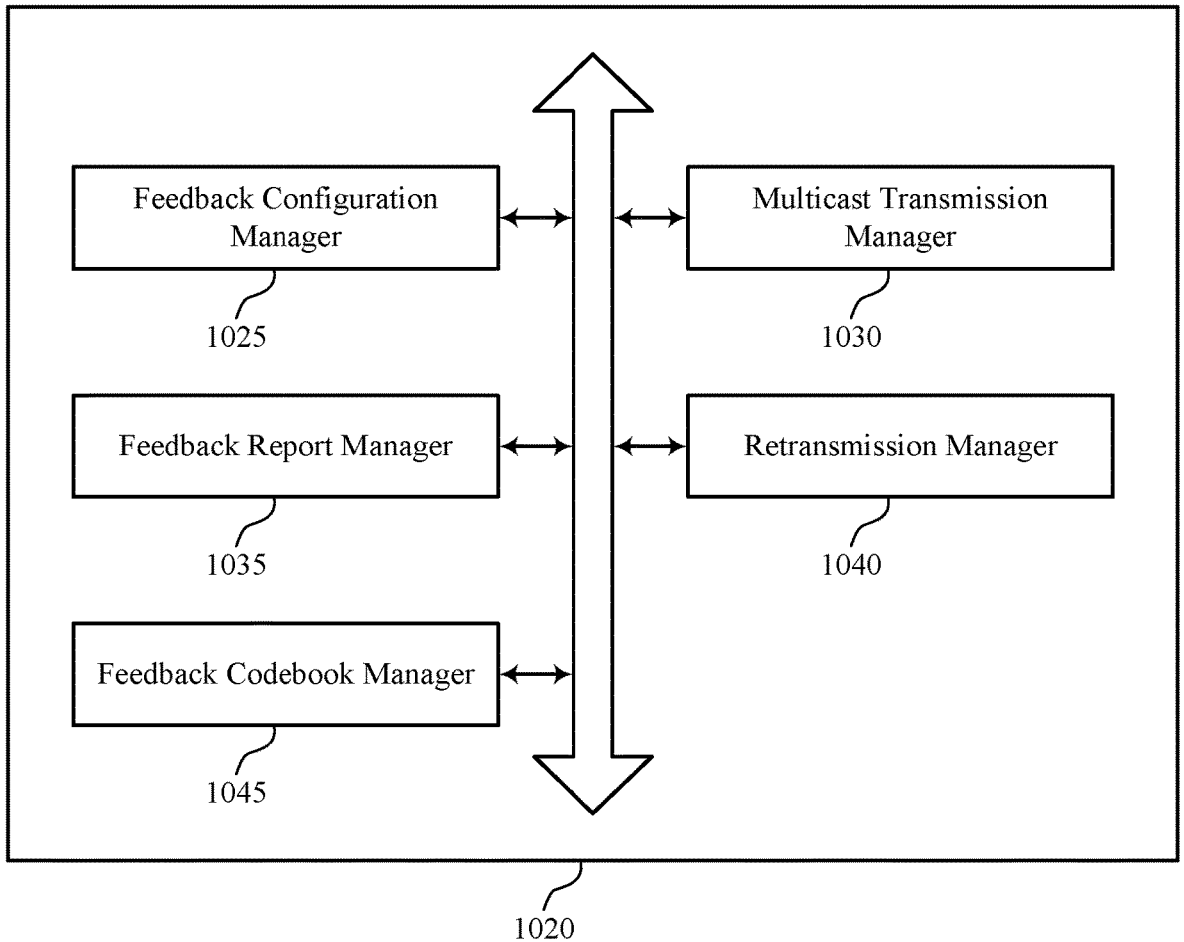
FIG. 10 shows a block diagram of a communications manager that supports feedback techniques for multicast and unicast communications in accordance with aspects of the present disclosure.

FIG. 10 shows a block diagram 1000 of a communications manager 1020 that supports feedback techniques for multicast and unicast communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of feedback techniques for multicast and unicast communications as described herein. For example, the communications manager 1020 may include a feedback configuration manager 1025, a multicast transmission manager 1030, a feedback report manager 1035, a retransmission manager 1040, a feedback codebook manager 1045, or any combination thereof. Each of these components may communicate, directly or indirectly, with one another (e.g., via one or more buses).

The communications manager 1020 may support wireless communications at a base station in accordance with examples as disclosed herein. The feedback configuration manager 1025 may be configured as or otherwise support a means for transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The multicast transmission manager 1030 may be configured as or otherwise support a means for transmitting a first multicast data communication to the first UE and at least one or more other UEs, the first multicast data communication associated with a first feedback process of the subset of feedback processes. The feedback report manager 1035 may be configured as or otherwise support a means for receiving, from the first UE, a feedback report based on the feedback configuration.

In some examples, the feedback configuration manager 1025 may be configured as or otherwise support a means for transmitting multicast scheduling information that indicates ACK/NACK feedback is to be provided for the multicast data communications, and where the feedback configuration further indicates that the subset of feedback processes have a multicast-only configuration. In some examples, the retransmission manager 1040 may be configured as or otherwise support a means for transmitting, responsive the feedback report including a NACK indication for the first feedback process, a retransmission of the first multicast data communication, where the retransmission is transmitted in a point-to-point transmission from the base station to the first UE that indicates a first feedback process identification that is associated with the first feedback process.

In some examples, the feedback configuration manager 1025 may be configured as or otherwise support a means for transmitting multicast scheduling information that indicates ACK/NACK feedback is to be provided for the multicast data communications, and where the feedback configuration further indicates that the subset of feedback processes have a multicast-or-unicast configuration.

In some examples, the retransmission manager 1040 may be configured as or otherwise support a means for transmitting, responsive the feedback report including a NACK indication for the first feedback process, a retransmission of the first multicast data communication, where the retransmission is transmitted in a point-to-point transmission from the base station to the first UE that indicates a first feedback process identification that is associated with the first feedback process, and where the point-to-point transmission further indicates whether the retransmission is associated with a multicast data transmission or a unicast data transmission. In some examples, the point-to-point transmission includes a control information field, or is transmitted in a scheduling window, that indicates whether the retransmission is associated with a multicast data transmission or a unicast data transmission.

In some examples, the feedback configuration manager 1025 may be configured as or otherwise support a means for transmitting multicast scheduling information that indicates no-feedback or NACK-only feedback is to be provided for the multicast data communications, and where the subset of feedback processes have a multicast-or-unicast configuration based on the no-feedback or NACK-only feedback for the multicast data communications.

In some examples, the feedback configuration is transmitted in one or more of radio resource control signaling, a medium access control (MAC) control element, a group common downlink control information (GC-DCI), or any combinations thereof, as an explicit indication of the multicast-only configuration or the multicast-or-unicast configuration for each feedback process of at least the subset of feedback processes. In some examples, the feedback configuration is based on an implicit indication provided by a feedback timing value, a control channel resource indicator value for providing the feedback report, a radio network temporary identifier (RNTI) associated with control information that schedules the first multicast data communication, or any combinations thereof.

In some examples, the feedback report includes a feedback codebook that includes a set of bits that are associated with a set of multiple reception candidate occasions and where, when the subset of feedback processes have the multicast-only configuration, each reception candidate occasion of the set of multiple reception candidate occasions is included in the feedback codebook. In some examples, the feedback report includes a feedback codebook that includes a set of bits that are associated with a set of multiple reception candidate occasions and where, when the subset of feedback processes have the multicast-or-unicast configuration and feedback for the multicast data communications are disabled or are NACK-only, the feedback codebook includes bits for one or more of the set of multiple reception candidate occasions based on a type of feedback codebook that is configured for providing the feedback report.

Figure 11:
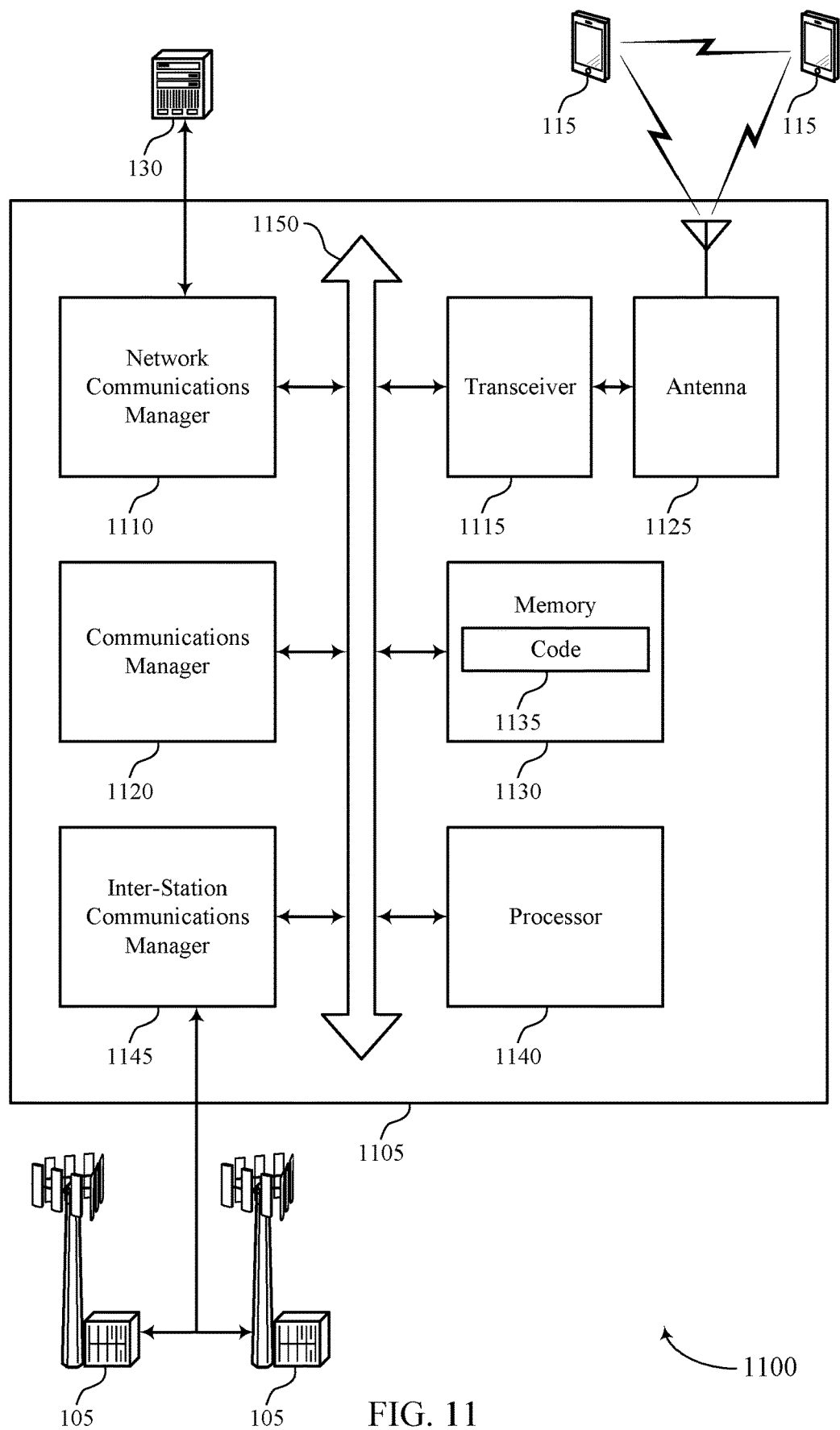
FIG. 11 shows a diagram of a system including a device that supports feedback techniques for multicast and unicast communications in accordance with aspects of the present disclosure.

FIG. 11 shows a diagram of a system 1100 including a device 1105 that supports feedback techniques for multicast and unicast communications in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting feedback techniques for multicast and unicast communications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The communications manager 1120 may be configured as or otherwise support a means for transmitting a first multicast data communication to the first UE and at least one or more other UEs, the first multicast data communication associated with a first feedback process of the subset of feedback processes. The communications manager 1120 may be configured as or otherwise support a means for receiving, from the first UE, a feedback report based on the feedback configuration.

By including or configuring the communications manager 1120 in accordance with examples as described herein, the device 1105 may support techniques for multicast and unicast feedback that may use a shared set of feedback processes, which may provide for more efficient utilization of communication resources through flexibility in feedback process allocation to different types of communications. Such techniques may allow for more efficient assignment of feedback processes, which may allow for enhanced communications throughput based on a mix of PTP and PTM traffic that is present.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of feedback techniques for multicast and unicast communications as described herein, or the processor 1140 and the memory 1130 may be otherwise configured to perform or support such operations.

Figure 12:
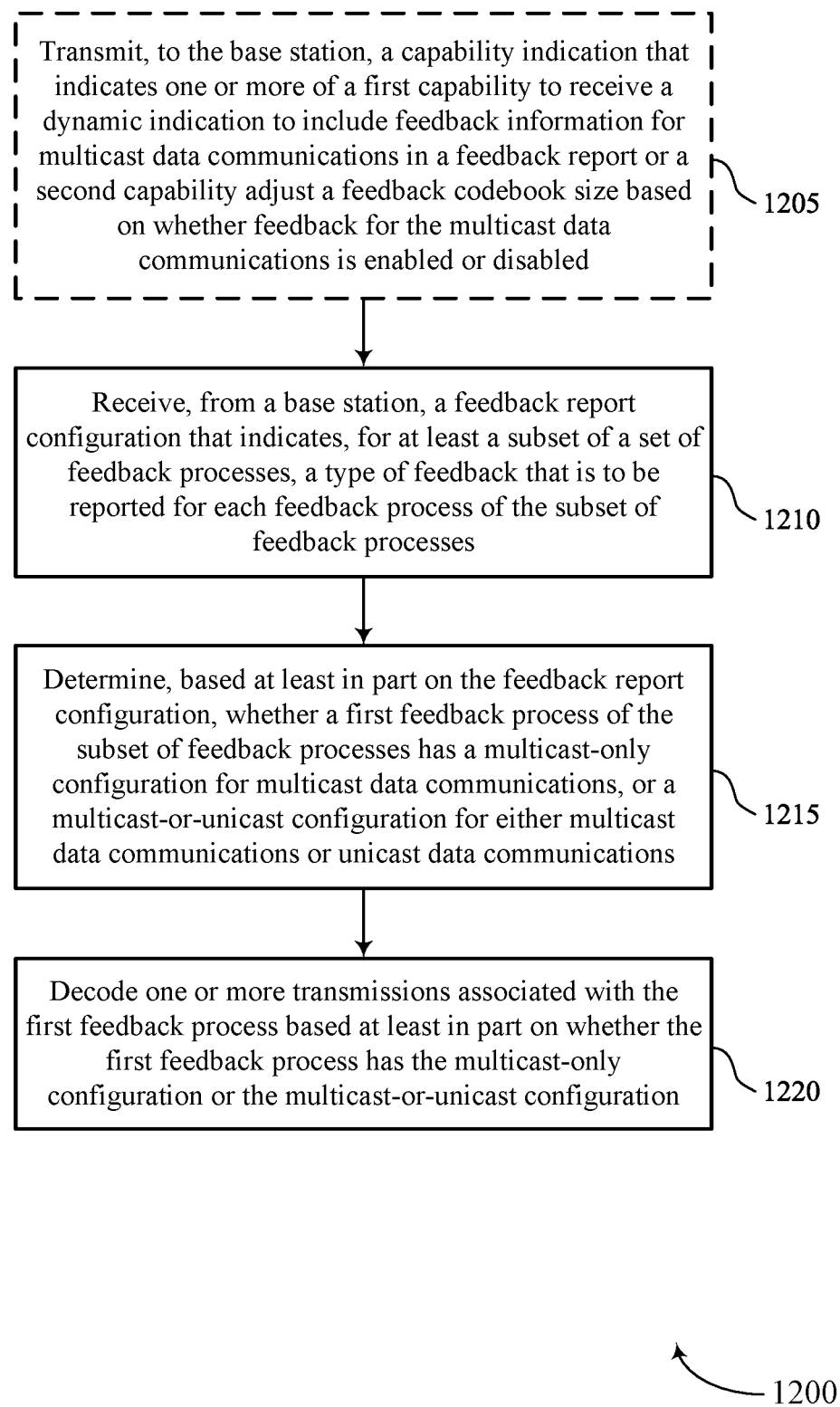
FIGS. 12 through 20 show flowcharts illustrating methods that support feedback techniques for multicast and unicast communications in accordance with aspects of the present disclosure.

FIG. 12 shows a flowchart illustrating a method 1200 that supports feedback techniques for multicast and unicast communications in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

Optionally, at 1205, the method may include transmitting, to the base station, a capability indication that indicates one or more of a first capability to receive a dynamic indication to include feedback information for the multicast data communications in a feedback report or a second capability adjust a feedback codebook size based on whether feedback for the multicast data communications is enabled or disabled. The operations of 1205 may be performed in accordance with examples as disclosed herein. In some examples, aspects of the operations of 1205 may be performed by a capability manager 645 as described with reference to FIG. 6.

At 1210, the method may include receiving, from a base station, a feedback report configuration that indicates, for at least a subset of a set of feedback processes, a type of feedback that is to be reported for each feedback process of the subset of feedback processes. The operations of 1210 may be performed in accordance with examples as disclosed herein. In some examples, aspects of the operations of 1210 may be performed by a feedback configuration manager 625 as described with reference to FIG. 6.

At 1215, the method may include determining, based on the feedback report configuration, whether a first feedback process of the subset of feedback processes has a multicast-only configuration for multicast data communications, or a multicast-or-unicast configuration for either multicast data communications or unicast data communications. The operations of 1215 may be performed in accordance with examples as disclosed herein. In some examples, aspects of the operations of 1215 may be performed by a feedback process manager 630 as described with reference to FIG. 6.

At 1220, the method may include decoding one or more transmissions associated with the first feedback process based on whether the first feedback process has the multicast-only configuration or the multicast-or-unicast configuration. The operations of 1220 may be performed in accordance with examples as disclosed herein. In some examples, aspects of the operations of 1220 may be performed by a decoding manager 635 as described with reference to FIG. 6.

Figure 13:
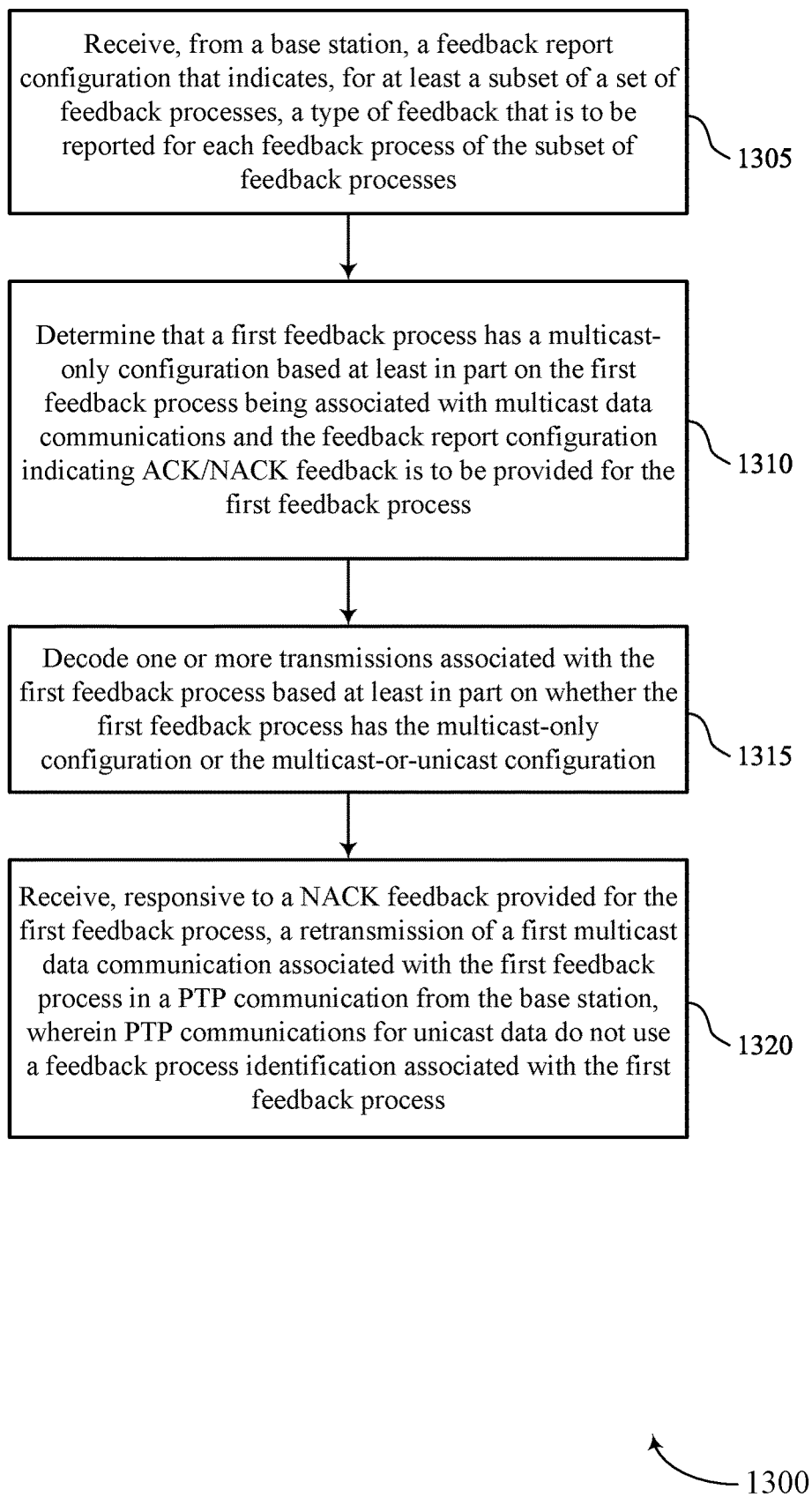

FIG. 13 shows a flowchart illustrating a method 1300 that supports feedback techniques for multicast and unicast communications in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a feedback report configuration that indicates, for at least a subset of a set of feedback processes, a type of feedback that is to be reported for each feedback process of the subset of feedback processes. The operations of 1305 may be performed in accordance with examples as disclosed herein. In some examples, aspects of the operations of 1305 may be performed by a feedback configuration manager 625 as described with reference to FIG. 6.

At 1310, the method may include determining that a first feedback process has a multicast-only configuration based on the first feedback process being associated with multicast data communications and the feedback report configuration indicating ACK/NACK feedback is to be provided for the first feedback process. The operations of 1310 may be performed in accordance with examples as disclosed herein. In some examples, aspects of the operations of 1310 may be performed by a feedback process manager 630 as described with reference to FIG. 6.

At 1315, the method may include decoding one or more transmissions associated with the first feedback process based on whether the first feedback process has the multicast-only configuration or the multicast-or-unicast configuration. The operations of 1315 may be performed in accordance with examples as disclosed herein. In some examples, aspects of the operations of 1315 may be performed by a decoding manager 635 as described with reference to FIG. 6.

At 1320, the method may include receiving, responsive to a NACK feedback provided for the first feedback process, a retransmission of a first multicast data communication associated with the first feedback process in a PTP communication from the base station, where PTP communications for unicast data do not use a feedback process identification associated with the first feedback process. The operations of 1320 may be performed in accordance with examples as disclosed herein. In some examples, aspects of the operations of 1320 may be performed by a retransmission manager 650 as described with reference to FIG. 6.

Figure 14:
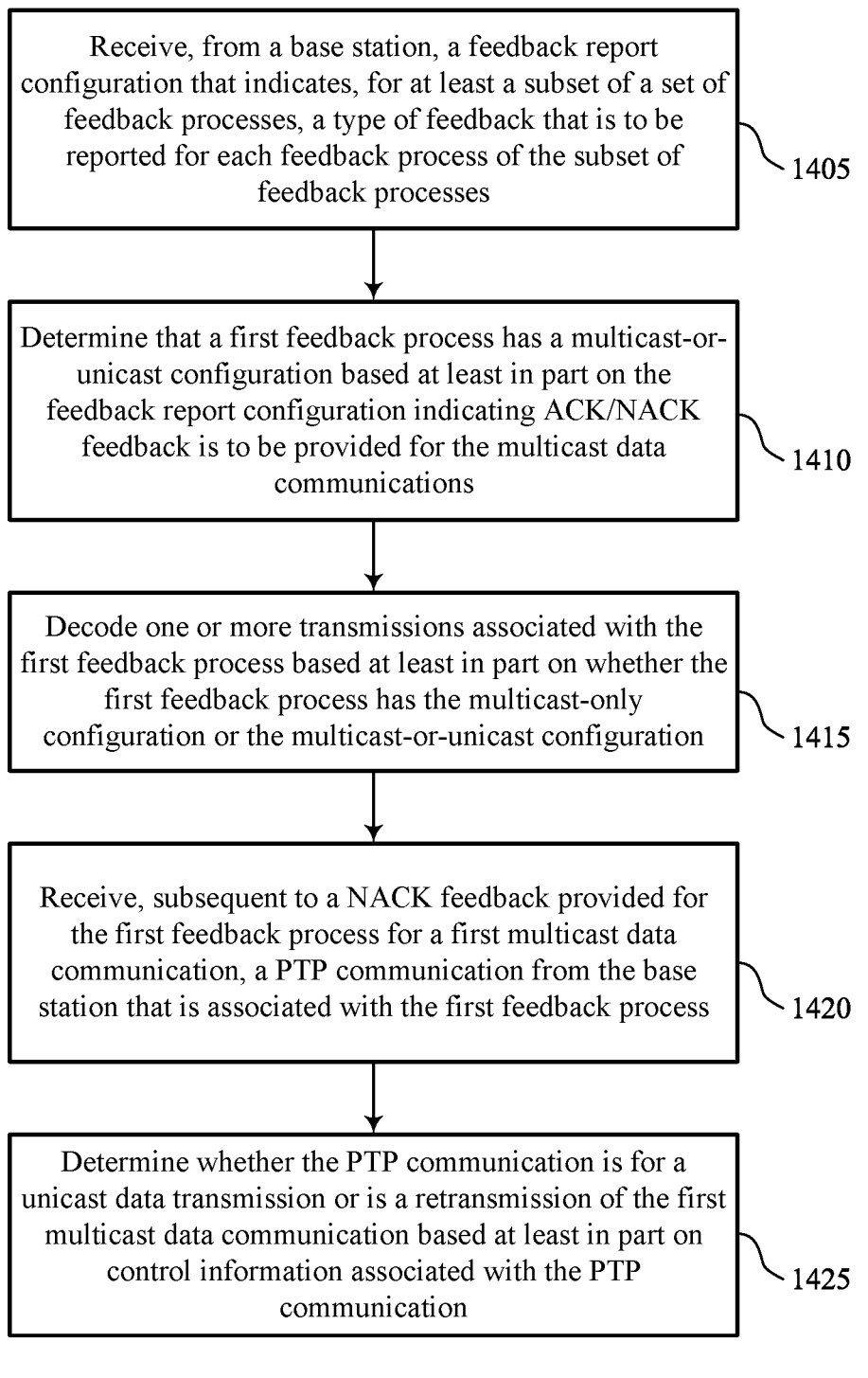

FIG. 14 shows a flowchart illustrating a method 1400 that supports feedback techniques for multicast and unicast communications in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a feedback report configuration that indicates, for at least a subset of a set of feedback processes, a type of feedback that is to be reported for each feedback process of the subset of feedback processes. The operations of 1405 may be performed in accordance with examples as disclosed herein. In some examples, aspects of the operations of 1405 may be performed by a feedback configuration manager 625 as described with reference to FIG. 6.

At 1410, the method may include determining that a first feedback process has a multicast-or-unicast configuration based on the feedback report configuration indicating ACK/NACK feedback is to be provided for the multicast data communications. The operations of 1410 may be performed in accordance with examples as disclosed herein. In some examples, aspects of the operations of 1410 may be performed by a feedback process manager 630 as described with reference to FIG. 6.

At 1415, the method may include decoding one or more transmissions associated with the first feedback process based on whether the first feedback process has the multicast-only configuration or the multicast-or-unicast configuration. The operations of 1415 may be performed in accordance with examples as disclosed herein. In some examples, aspects of the operations of 1415 may be performed by a decoding manager 635 as described with reference to FIG. 6.

At 1420, the method may include receiving, subsequent to a NACK feedback provided for the first feedback process for a first multicast data communication, a PTP communication from the base station that is associated with the first feedback process. The operations of 1420 may be performed in accordance with examples as disclosed herein. In some examples, aspects of the operations of 1420 may be performed by a retransmission manager 650 as described with reference to FIG. 6.

At 1425, the method may include determining whether the PTP communication is for a unicast data transmission or is a retransmission of the first multicast data communication based on control information associated with the PTP communication. The operations of 1425 may be performed in accordance with examples as disclosed herein. In some examples, aspects of the operations of 1425 may be performed by a retransmission manager 650 as described with reference to FIG. 6.

Figure 15:
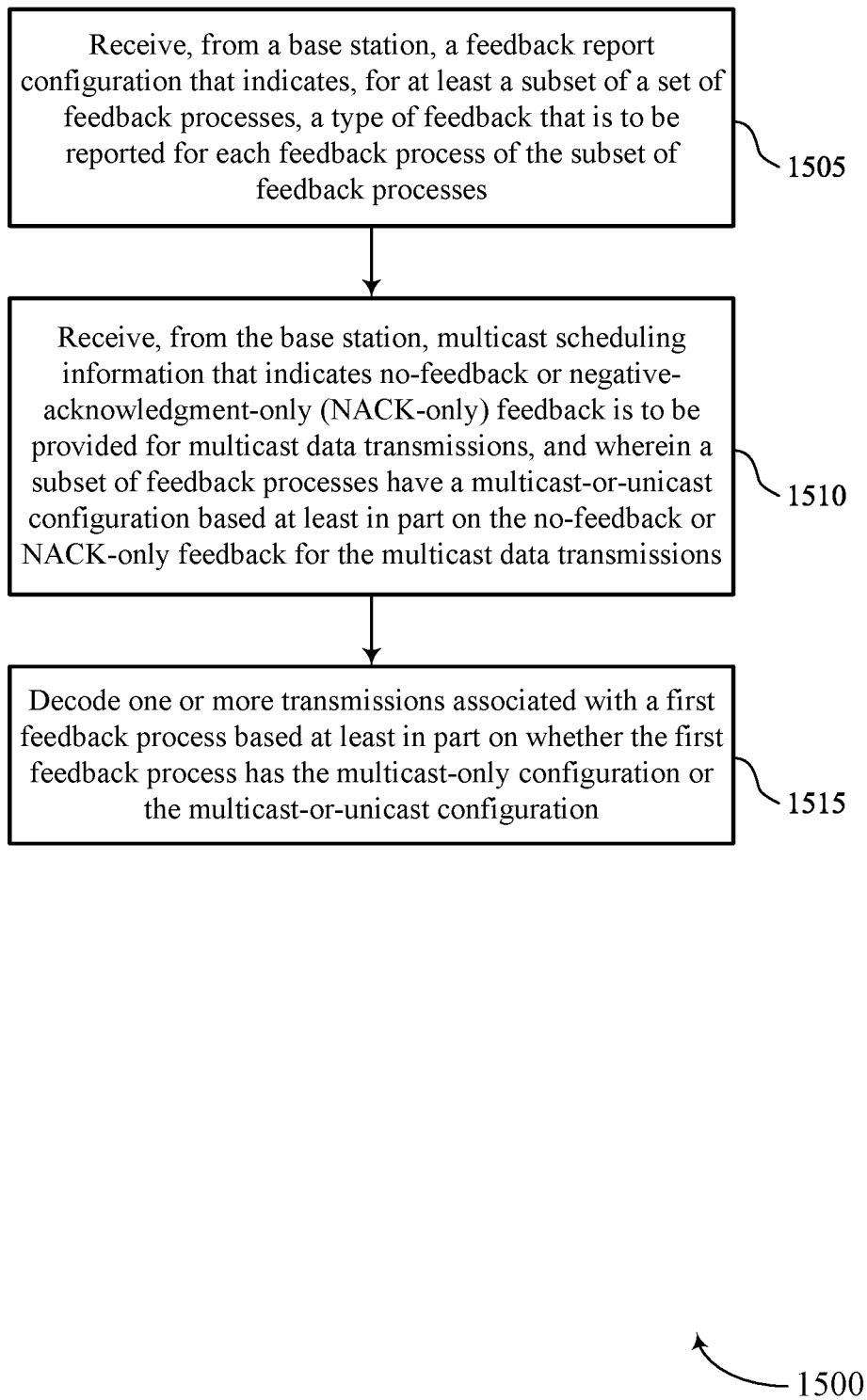

FIG. 15 shows a flowchart illustrating a method 1500 that supports feedback techniques for multicast and unicast communications in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a feedback report configuration that indicates, for at least a subset of a set of feedback processes, a type of feedback that is to be reported for each feedback process of the subset of feedback processes. The operations of 1505 may be performed in accordance with examples as disclosed herein. In some examples, aspects of the operations of 1505 may be performed by a feedback configuration manager 625 as described with reference to FIG. 6.

At 1510, the method may include receiving, from the base station, multicast scheduling information that indicates no-feedback or NACK-only feedback is to be provided for multicast data transmissions, and where a subset of feedback processes have a multicast-or-unicast configuration based on the no-feedback or NACK-only feedback for the multicast data transmissions. The operations of 1510 may be performed in accordance with examples as disclosed herein. In some examples, aspects of the operations of 1510 may be performed by a feedback process manager 630 as described with reference to FIG. 6.

At 1515, the method may include decoding one or more transmissions associated with a first feedback process based on whether the first feedback process has the multicast-only configuration or the multicast-or-unicast configuration. The operations of 1515 may be performed in accordance with examples as disclosed herein. In some examples, aspects of the operations of 1515 may be performed by a decoding manager 635 as described with reference to FIG. 6.

Figure 16:
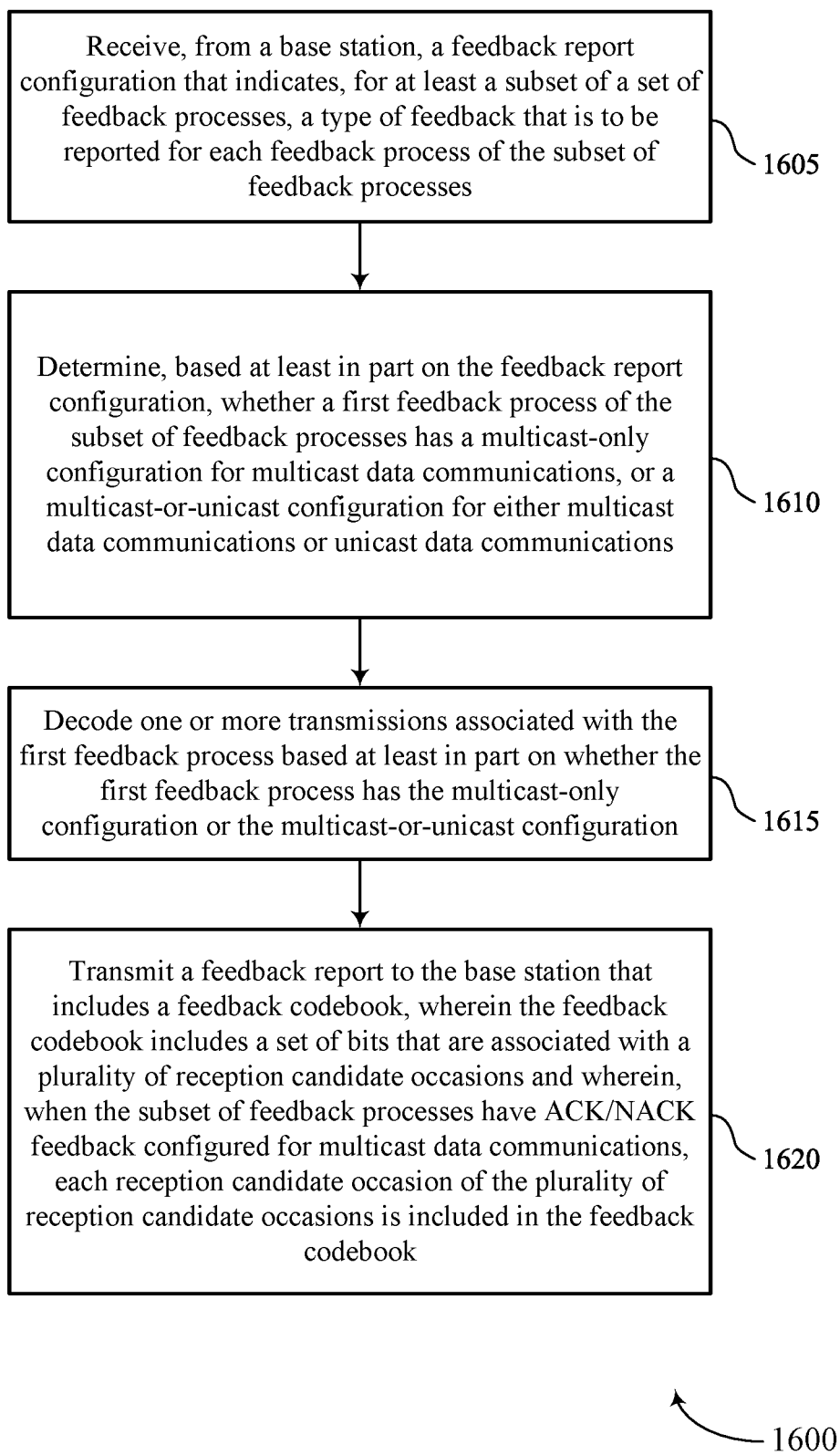

FIG. 16 shows a flowchart illustrating a method 1600 that supports feedback techniques for multicast and unicast communications in accordance with aspects of the present disclosure. The operations of the method 1600 may be implemented by a UE or its components as described herein. For example, the operations of the method 1600 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a feedback report configuration that indicates, for at least a subset of a set of feedback processes, a type of feedback that is to be reported for each feedback process of the subset of feedback processes. The operations of 1605 may be performed in accordance with examples as disclosed herein. In some examples, aspects of the operations of 1605 may be performed by a feedback configuration manager 625 as described with reference to FIG. 6.

At 1610, the method may include determining, based on the feedback report configuration, whether a first feedback process of the subset of feedback processes has a multicast-only configuration for multicast data communications, or a multicast-or-unicast configuration for either multicast data communications or unicast data communications. The operations of 1610 may be performed in accordance with examples as disclosed herein. In some examples, aspects of the operations of 1610 may be performed by a feedback process manager 630 as described with reference to FIG. 6.

At 1615, the method may include decoding one or more transmissions associated with the first feedback process based on whether the first feedback process has the multicast-only configuration or the multicast-or-unicast configuration. The operations of 1615 may be performed in accordance with examples as disclosed herein. In some examples, aspects of the operations of 1615 may be performed by a decoding manager 635 as described with reference to FIG. 6.

At 1620, the method may include transmitting a feedback report to the base station that includes a feedback codebook, where the feedback codebook includes a set of bits that are associated with a set of multiple reception candidate occasions and where, when the subset of feedback processes have ACK/NACK feedback configured for multicast data communications, each reception candidate occasion of the set of multiple reception candidate occasions is included in the feedback codebook. The operations of 1620 may be performed in accordance with examples as disclosed herein. In some examples, aspects of the operations of 1620 may be performed by a feedback codebook manager 640 as described with reference to FIG. 6.

Figure 17:
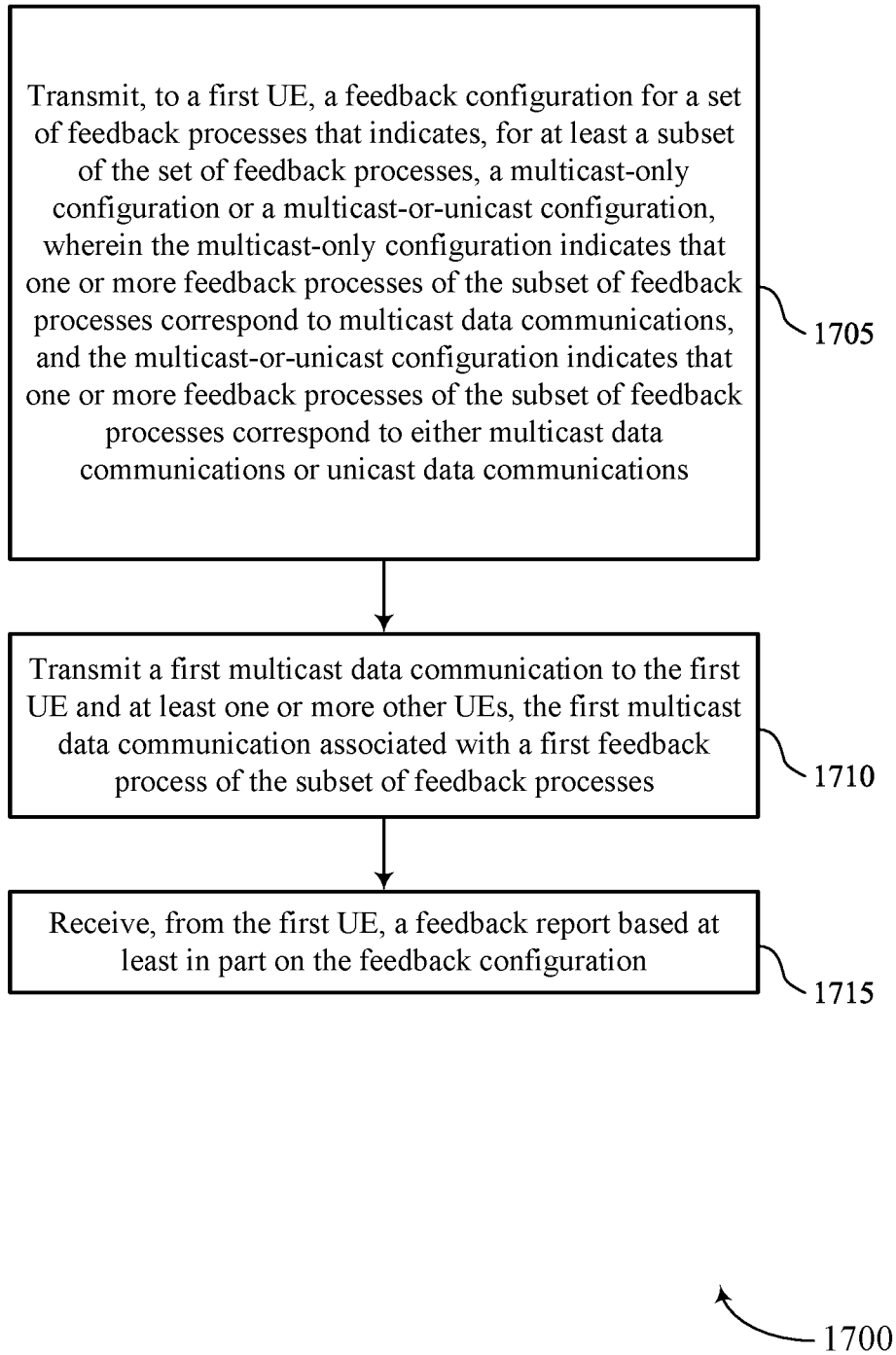

FIG. 17 shows a flowchart illustrating a method 1700 that supports feedback techniques for multicast and unicast communications in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include transmitting, to a first UE, a feedback configuration for a set of feedback processes that indicates, for at least a subset of the set of feedback processes, a multicast-only configuration or a multicast-orunicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The operations of 1705 may be performed in accordance with examples as disclosed herein. In some examples, aspects of the operations of 1705 may be performed by a feedback configuration manager 1025 as described with reference to FIG. 10.

At 1710, the method may include transmitting a first multicast data communication to the first UE and at least one or more other UEs, the first multicast data communication associated with a first feedback process of the subset of feedback processes. The operations of 1710 may be performed in accordance with examples as disclosed herein. In some examples, aspects of the operations of 1710 may be performed by a multicast transmission manager 1030 as described with reference to FIG. 10.

At 1715, the method may include receiving, from the first UE, a feedback report based on the feedback configuration. The operations of 1715 may be performed in accordance with examples as disclosed herein. In some examples, aspects of the operations of 1715 may be performed by a feedback report manager 1035 as described with reference to FIG. 10.

Figure 18:
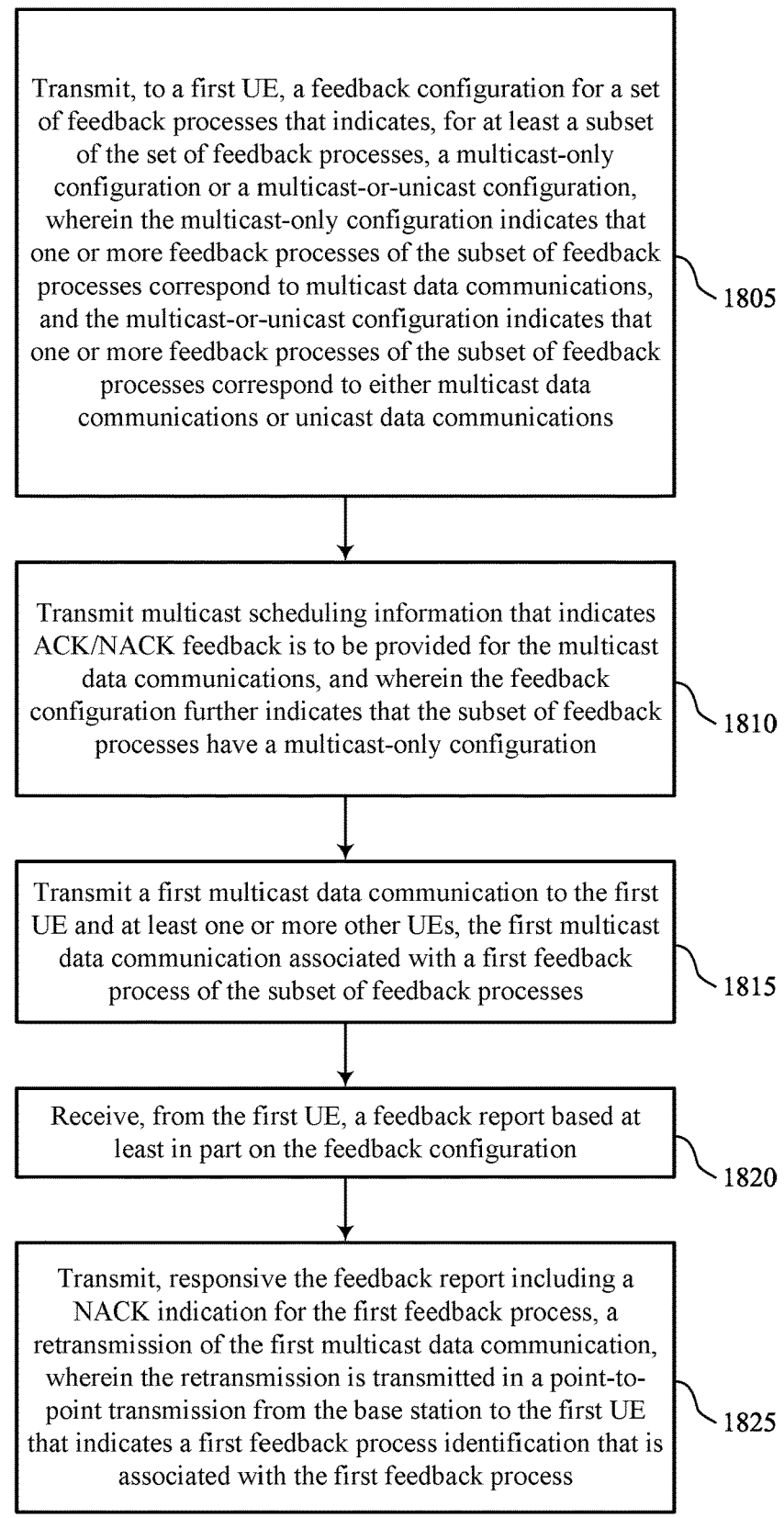

FIG. 18 shows a flowchart illustrating a method 1800 that supports feedback techniques for multicast and unicast communications in accordance with aspects of the present disclosure. The operations of the method 1800 may be implemented by a base station or its components as described herein. For example, the operations of the method 1800 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1805, the method may include transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The operations of 1805 may be performed in accordance with examples as disclosed herein. In some examples, aspects of the operations of 1805 may be performed by a feedback configuration manager 1025 as described with reference to FIG. 10.

At 1810, the method may include transmitting multicast scheduling information that indicates ACK/NACK feedback is to be provided for the multicast data communications, and where the feedback configuration further indicates that the subset of feedback processes have a multicast-only configuration. The operations of 1810 may be performed in accordance with examples as disclosed herein. In some examples, aspects of the operations of 1810 may be performed by a feedback configuration manager 1025 as described with reference to FIG. 10.

At 1815, the method may include transmitting a first multicast data communication to the first UE and at least one or more other UEs, the first multicast data communication associated with a first feedback process of the subset of feedback processes. The operations of 1815 may be performed in accordance with examples as disclosed herein. In some examples, aspects of the operations of 1815 may be performed by a multicast transmission manager 1030 as described with reference to FIG. 10.

At 1820, the method may include receiving, from the first UE, a feedback report based on the feedback configuration. The operations of 1820 may be performed in accordance with examples as disclosed herein. In some examples, aspects of the operations of 1820 may be performed by a feedback report manager 1035 as described with reference to FIG. 10.

At 1825, the method may include transmitting, responsive the feedback report including a NACK indication for the first feedback process, a retransmission of the first multicast data communication, where the retransmission is transmitted in a point-to-point transmission from the base station to the first UE that indicates a first feedback process identification that is associated with the first feedback process. The operations of 1825 may be performed in accordance with examples as disclosed herein. In some examples, aspects of the operations of 1825 may be performed by a retransmission manager 1040 as described with reference to FIG. 10.

Figure 19:
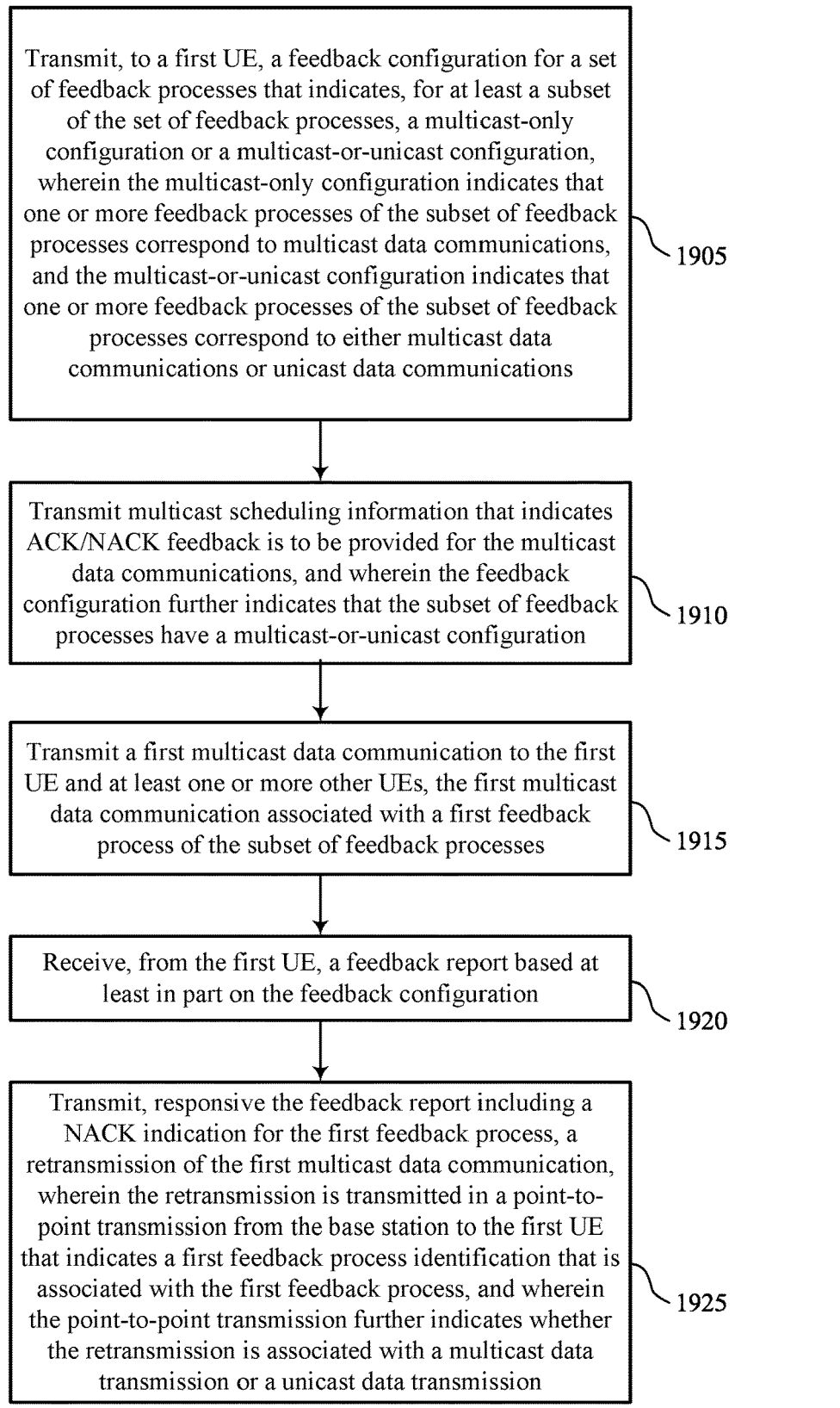

FIG. 19 shows a flowchart illustrating a method 1900 that supports feedback techniques for multicast and unicast communications in accordance with aspects of the present disclosure. The operations of the method 1900 may be implemented by a base station or its components as described herein. For example, the operations of the method 1900 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1905, the method may include transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The operations of 1905 may be performed in accordance with examples as disclosed herein. In some examples, aspects of the operations of 1905 may be performed by a feedback configuration manager 1025 as described with reference to FIG. 10.

At 1910, the method may include transmitting multicast scheduling information that indicates ACK/NACK feedback is to be provided for the multicast data communications, and where the feedback configuration further indicates that the subset of feedback processes have a multicast-or-unicast configuration. The operations of 1910 may be performed in accordance with examples as disclosed herein. In some examples, aspects of the operations of 1910 may be performed by a feedback configuration manager 1025 as described with reference to FIG. 10.

At 1915, the method may include transmitting a first multicast data communication to the first UE and at least one or more other UEs, the first multicast data communication associated with a first feedback process of the subset of feedback processes. The operations of 1915 may be performed in accordance with examples as disclosed herein. In some examples, aspects of the operations of 1915 may be performed by a multicast transmission manager 1030 as described with reference to FIG. 10.

At 1920, the method may include receiving, from the first UE, a feedback report based on the feedback configuration. The operations of 1920 may be performed in accordance with examples as disclosed herein. In some examples, aspects of the operations of 1920 may be performed by a feedback report manager 1035 as described with reference to FIG. 10.

At 1925, the method may include transmitting, responsive the feedback report including a NACK indication for the first feedback process, a retransmission of the first multicast data communication, where the retransmission is transmitted in a point-to-point transmission from the base station to the first UE that indicates a first feedback process identification that is associated with the first feedback process, and where the point-to-point transmission further indicates whether the retransmission is associated with a multicast data transmission or a unicast data transmission. The operations of 1925 may be performed in accordance with examples as disclosed herein. In some examples, aspects of the operations of 1925 may be performed by a retransmission manager 1040 as described with reference to FIG. 10.

Figure 20:
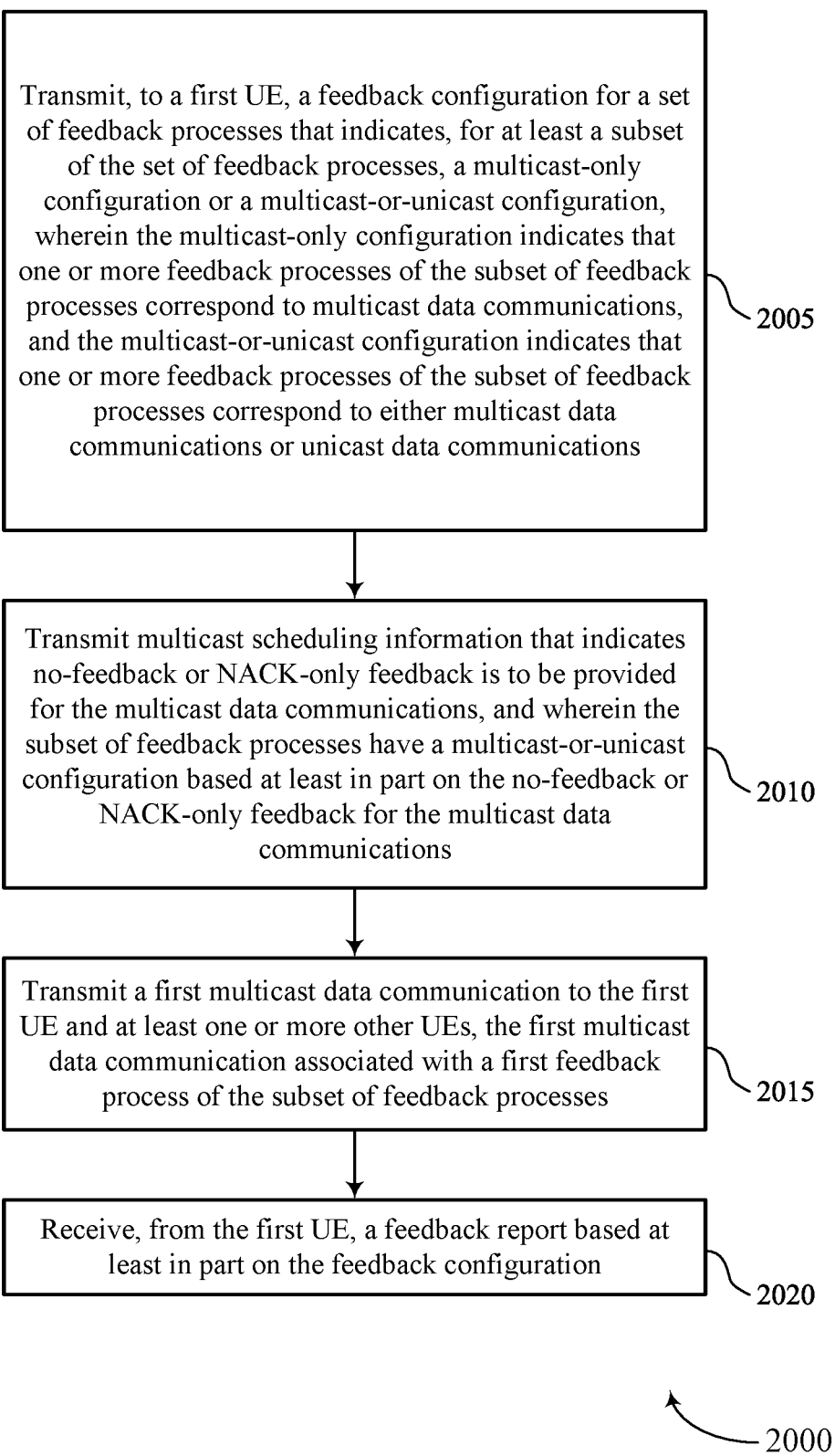

FIG. 20 shows a flowchart illustrating a method 2000 that supports feedback techniques for multicast and unicast communications in accordance with aspects of the present disclosure. The operations of the method 2000 may be implemented by a base station or its components as described herein. For example, the operations of the method 2000 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 2005, the method may include transmitting, to a first UE, a feedback configuration for a set of feedback processes that indicates, for at least a subset of the set of feedback processes, a multicast-only configuration or a multicast-or-unicast configuration, where the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications. The operations of 2005 may be performed in accordance with examples as disclosed herein. In some examples, aspects of the operations of 2005 may be performed by a feedback configuration manager 1025 as described with reference to FIG. 10.

At 2010, the method may include transmitting multicast scheduling information that indicates no-feedback or NACK-only feedback is to be provided for the multicast data communications, and where the subset of feedback processes have a multicast-or-unicast configuration based on the no-feedback or NACK-only feedback for the multicast data communications. The operations of 2010 may be performed in accordance with examples as disclosed herein. In some examples, aspects of the operations of 2010 may be performed by a feedback configuration manager 1025 as described with reference to FIG. 10.

At 2015, the method may include transmitting a first multicast data communication to the first UE and at least one or more other UEs, the first multicast data communication associated with a first feedback process of the subset of feedback processes. The operations of 2015 may be performed in accordance with examples as disclosed herein. In some examples, aspects of the operations of 2015 may be performed by a multicast transmission manager 1030 as described with reference to FIG. 10.

At 2020, the method may include receiving, from the first UE, a feedback report based on the feedback configuration. The operations of 2020 may be performed in accordance with examples as disclosed herein. In some examples, aspects of the operations of 2020 may be performed by a feedback report manager 1035 as described with reference to FIG. 10.

The following provides an overview of aspects of the present disclosure:

Aspect 1: A method for wireless communications at a first UE, comprising: receiving, from a base station, a feedback report configuration that indicates, for at least a subset of a set of feedback processes, a type of feedback that is to be reported for each feedback process of the subset of feedback processes; determining, based at least in part on the feedback report configuration, whether a first feedback process of the subset of feedback processes has a multicast-only configuration for multicast data communications, or a multicast-or-unicast configuration for either multicast data communications or unicast data communications; and decoding one or more transmissions associated with the first feedback process based at least in part on whether the first feedback process has the multicast-only configuration or the multicast-or-unicast configuration.

Aspect 2: The method of aspect 1, wherein the determining comprises: determining that the first feedback process has the multicast-only configuration based at least in part on the first feedback process being associated with multicast data communications and the feedback report configuration indicating ACK/NACK feedback is to be provided for the first feedback process.

Aspect 3: The method of aspect 2, further comprising: receiving, responsive to a NACK feedback provided for the first feedback process, a retransmission of a first multicast data communication associated with the first feedback process in a PTP communication from the base station, wherein PTP communications for unicast data do not use a feedback process identification associated with the first feedback process.

Aspect 4: The method of aspect 1, wherein the determining comprises: determining that the first feedback process has the multicast-or-unicast configuration based at least in part on the feedback report configuration indicating ACK/NACK feedback is to be provided for the multicast data communications.

Aspect 5: The method of aspect 4, further comprising: receiving, subsequent to a NACK feedback provided for the first feedback process for a first multicast data communication, a PTP communication from the base station that is associated with the first feedback process; and determining whether the PTP communication is for unicast data or is a retransmission of the first multicast data communication based at least in part on control information associated with the PTP communication.

Aspect 6: The method of aspect 5, wherein the PTP communication includes a control information field, or is transmitted in a scheduling window, that indicates whether the PTP communication is the retransmission of the first multicast data communication or for the unicast data transmission.

Aspect 7: The method of aspect 1, further comprising: receiving, from the base station, multicast scheduling information that indicates no-feedback or NACK-only feedback is to be provided for multicast data transmissions, and wherein the subset of feedback processes have a multicast-or-unicast configuration based at least in part on the no-feedback or NACK-only feedback for the multicast data transmissions.

Aspect 8: The method of aspect 7, wherein a PTP transmission between the base station and the first UE cannot be used for a retransmission of a first multicast data transmission when no-feedback or NACK-only feedback is to be provided for the multicast data transmissions.

Aspect 9: The method of aspect 7, wherein a same feedback process identification as used for a first multicast data transmission in a PTM transmission is included in scheduling information for a unicast data transmission in a PTP transmission from the base station.

Aspect 10: The method of any of aspects 1 through 9, wherein the feedback report configuration is received in one or more of RRC signaling, a MAC-CE, a GC-DCI, or any combinations thereof, as an explicit indication of a multicast feedback configuration that indicates whether each feedback process of at least the subset of feedback processes is configured for ACK/NACK feedback, NACK-only feedback, or has feedback disabled.

Aspect 11: The method of any of aspects 1 through 9, wherein the feedback report configuration is determined based on an implicit indication provided by a feedback timing value associated with the multicast data communications, a control channel resource indicator value for providing the feedback report associated with the multicast data communications, a RNTI associated with control information that schedules the multicast data communications, or any combinations thereof.

Aspect 12: The method of any of aspects 1 through 11, further comprising: transmitting a feedback report to the base station that includes a feedback codebook, wherein the feedback codebook includes a set of bits that are associated with a plurality of reception candidate occasions and wherein, when the subset of feedback processes have ACK/NACK feedback configured for multicast data communications, each reception candidate occasion of the plurality of reception candidate occasions is included in the feedback codebook.

Aspect 13: The method of any of aspects 1 through 12, wherein the feedback report includes a feedback codebook that includes a set of bits that are associated with a plurality of reception candidate occasions and wherein, when the subset of feedback processes have the multicast-or-unicast configuration and feedback for the multicast data communications are disabled or are NACK-only, the feedback codebook includes bits for one or more of the plurality of reception candidate occasions based at least in part on a type of feedback codebook that is configured for providing the feedback report.

Aspect 14: The method of any of aspects 1 through 13, further comprising: transmitting, to the base station, a capability indication that indicates one or more of a first capability to receive a dynamic indication to include feedback information for the multicast data communications in a feedback report or a second capability adjust a feedback codebook size based on whether feedback for the multicast data communications is enabled or disabled.

Aspect 15: A method for wireless communications at a base station, comprising: transmitting, to a first UE, a feedback configuration for a set of feedback processes that indicates, for at least a subset of the set of feedback processes, a multicast-only configuration or a multicast-or-unicast configuration, wherein the multicast-only configuration indicates that one or more feedback processes of the subset of feedback processes correspond to multicast data communications, and the multicast-or-unicast configuration indicates that one or more feedback processes of the subset of feedback processes correspond to either multicast data communications or unicast data communications; transmitting a first multicast data communication to the first UE and at least one or more other UEs, the first multicast data communication associated with a first feedback process of the subset of feedback processes; and receiving, from the first UE, a feedback report based at least in part on the feedback configuration.

Aspect 16: The method of aspect 15, further comprising: transmitting multicast scheduling information that indicates ACK/NACK feedback is to be provided for the multicast data communications, and wherein the feedback configuration further indicates that the subset of feedback processes have a multicast-only configuration; and transmitting, responsive the feedback report including a NACK indication for the first feedback process, a retransmission of the first multicast data communication, wherein the retransmission is transmitted in a point-to-point transmission from the base station to the first UE that indicates a first feedback process identification that is associated with the first feedback process.

Aspect 17: The method of aspect 15, further comprising: transmitting multicast scheduling information that indicates ACK/NACK feedback is to be provided for the multicast data communications, and wherein the feedback configuration further indicates that the subset of feedback processes have a multicast-or-unicast configuration.

Aspect 18: The method of aspect 17, further comprising: transmitting, responsive the feedback report including a NACK indication for the first feedback process, a retransmission of the first multicast data communication, wherein the retransmission is transmitted in a PTP transmission from the base station to the first UE that indicates a first feedback process identification that is associated with the first feedback process, and wherein the PTP transmission further indicates whether the retransmission is associated with a multicast data transmission or a unicast data transmission.

Aspect 19: The method of aspect 18, wherein the PTP transmission includes a control information field, or is transmitted in a scheduling window, that indicates whether the retransmission is associated with a multicast data transmission or a unicast data transmission.

Aspect 20: The method of aspect 15, further comprising: transmitting multicast scheduling information that indicates no-feedback or NACK-only feedback is to be provided for the multicast data communications, and wherein the subset of feedback processes have a multicast-or-unicast configuration based at least in part on the no-feedback or NACK-only feedback for the multicast data communications.

Aspect 21: The method of any of aspects 15 through 20, wherein the feedback configuration is transmitted in one or more of RRC signaling, a MAC-CE, a GC-DCI, or any combinations thereof, as an explicit indication of the multicast-only configuration or the multicast-or-unicast configuration for each feedback process of at least the subset of feedback processes.

Aspect 22: The method of any of aspects 15 through 20, wherein the feedback configuration is based on an implicit indication provided by a feedback timing value, a control channel resource indicator value for providing the feedback report, a RNTI associated with control information that schedules the first multicast data communication, or any combinations thereof.

Aspect 23: The method of any of aspects 15 through 22, wherein the feedback report includes a feedback codebook that includes a set of bits that are associated with a plurality of reception candidate occasions and wherein, when the subset of feedback processes have the multicast-only configuration, each reception candidate occasion of the plurality of reception candidate occasions is included in the feedback codebook.

Aspect 24: The method of any of aspects 15 through 22, wherein the feedback report includes a feedback codebook that includes a set of bits that are associated with a plurality of reception candidate occasions and wherein, when the subset of feedback processes have the multicast-or-unicast configuration and feedback for the multicast data communications are disabled or are negative-acknowledgment-only (NACK-only), the feedback codebook includes bits for one or more of the plurality of reception candidate occasions based at least in part on a type of feedback codebook that is configured for providing the feedback report.

Aspect 25: An apparatus for wireless communications at a first UE, comprising a processor; memory coupled with the processor; and instructions stored in the memory and executable by the processor to cause the apparatus to perform a method of any of aspects 1 through 14.

Aspect 26: An apparatus for wireless communications at a first UE, comprising at least one means for performing a method of any of aspects 1 through 14.

Aspect 27: A non-transitory computer-readable medium storing code for wireless communications at a first UE, the code comprising instructions executable by a processor to perform a method of any of aspects 1 through 14.

Aspect 28: An apparatus for wireless communications at a base station, comprising a processor; memory coupled with the processor; and instructions stored in the memory and executable by the processor to cause the apparatus to perform a method of any of aspects 15 through 24.

Aspect 29: An apparatus for wireless communications at a base station, comprising at least one means for performing a method of any of aspects 15 through 24.

Aspect 30: A non-transitory computer-readable medium storing code for wireless communications at a base station, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving a feedback report configuration that indicates, for at least a subset of a set of feedback processes, a type of feedback that is to be reported for each feedback process of the subset of feedback processes;
   determining, based at least in part on the feedback report configuration, whether a first feedback process of the subset of feedback processes has a multicast-only configuration wherein the first feedback process can be applied at the UE for only multicast data communications, or whether the first feedback process has a multicast-or-unicast configuration wherein the first feedback process can be applied at the UE for either multicast data communications or for unicast data communications but not for both multicast data communications and unicast data communications concurrently; and
   decoding one or more transmissions associated with the first feedback process based at least in part on whether the first feedback process has the multicast-only configuration or the multicast-or-unicast configuration.

2. The method of claim 1, wherein the determining comprises:
   determining that the first feedback process has the multicast-only configuration based at least in part on the first feedback process being associated with multicast data communications and the feedback report configuration indicating acknowledgment/negative-acknowledgment (ACK/NACK) feedback is to be provided for the first feedback process.

3. The method of claim 2, further comprising:
   receiving, responsive to a NACK feedback provided for the first feedback process, a retransmission of a first multicast data communication associated with the first feedback process in a point-to-point (PTP) communication from an access network entity, wherein PTP communications for unicast data do not use a feedback process identification associated with the first feedback process.

4. The method of claim 1, wherein the determining comprises:
   determining that the first feedback process has the multicast-or-unicast configuration based at least in part on the feedback report configuration indicating acknowledgment/negative-acknowledgment (ACK/NACK) feedback is to be provided for the multicast data communications.

5. The method of claim 4, further comprising:
   receiving, subsequent to a NACK feedback provided for the first feedback process for a first multicast data communication, a point-to-point (PTP) communication from an access network entity that is associated with the first feedback process; and
   determining whether the PTP communication is for unicast data or is a retransmission of the first multicast data communication based at least in part on control information associated with the PTP communication.

6. The method of claim 5, wherein the PTP communication includes a control information field, or is transmitted in a scheduling window, that indicates whether the PTP communication is the retransmission of the first multicast data communication or for a unicast data transmission.

7. The method of claim 1, further comprising:
   receiving multicast scheduling information that indicates no-feedback or negative-acknowledgment-only (NACK-only) feedback is to be provided for multicast data transmissions, and wherein the subset of feedback processes have the multicast-or-unicast configuration based at least in part on the no-feedback or NACK-only feedback for the multicast data transmissions.

8. The method of claim 7, wherein a point-to-point (PTP) transmission between an access network entity and the first UE cannot be used for a retransmission of a first multicast data transmission when no-feedback or NACK-only feedback is to be provided for the multicast data transmissions.

9. The method of claim 7, wherein a same feedback process identification as used for a first multicast data transmission in a point-to-multipoint (PTM) transmission is included in scheduling information for a unicast data transmission in a point-to-point (PTP) transmission from an access network entity.

10. The method of claim 1, wherein the feedback report configuration is received in one or more of radio resource control signaling, a medium access control (MAC) control element, a group common downlink control information (GC-DCI), or any combinations thereof, as an explicit indication of a multicast feedback configuration that indicates whether each feedback process of at least the subset of feedback processes is configured for acknowledgment/negative-acknowledgment (ACK/NACK) feedback, NACK-only feedback, or has feedback disabled.

11. The method of claim 1, wherein the feedback report configuration is determined based on an implicit indication provided by a feedback timing value associated with the multicast data communications, a control channel resource indicator value for providing the feedback report associated with the multicast data communications, a radio network temporary identifier (RNTI) associated with control information that schedules the multicast data communications, or any combinations thereof.

12. The method of claim 1, further comprising:
transmitting a feedback report that includes a feedback codebook, wherein the feedback codebook includes a set of bits that are associated with a plurality of reception candidate occasions and wherein, when the subset of feedback processes have acknowledgment/negative-acknowledgment (ACK/NACK) feedback configured for multicast data communications, each reception candidate occasion of the plurality of reception candidate occasions is included in the feedback codebook.

13. The method of claim 1, wherein the feedback report includes a feedback codebook that includes a set of bits that are associated with a plurality of reception candidate occasions and wherein, when the subset of feedback processes have the multicast-or-unicast configuration and feedback for the multicast data communications are disabled or are negative-acknowledgment-only (NACK-only), the feedback codebook includes bits for one or more of the plurality of reception candidate occasions based at least in part on a type of feedback codebook that is configured for providing the feedback report.

14. The method of claim 1, further comprising:
transmitting a capability indication that indicates one or more of a first capability to receive a dynamic indication to include feedback information for the multicast data communications in a feedback report or a second capability adjust a feedback codebook size based on whether feedback for the multicast data communications is enabled or disabled.

15. A method for wireless communications at an access network entity, comprising:
transmitting, to a first user equipment (UE), a feedback configuration for a set of feedback processes that indicates, for at least a subset of the set of feedback processes, a multicast-only configuration or a multicast-or-unicast configuration, wherein the multicast-only configuration indicates that one or more feedback processes of the subset of feedback processes correspond to only multicast data communications, and wherein the multicast-or-unicast configuration indicates that one or more feedback processes of the subset of feedback processes correspond to either multicast data communications or unicast data communications but not to both multicast data communications and unicast data communications concurrently;
transmitting a first multicast data communication to the first UE and at least one or more other UEs, the first multicast data communication associated with a first feedback process of the subset of feedback processes; and
receiving, from the first UE, a feedback report based at least in part on the feedback configuration.

16. The method of claim 15, further comprising:
transmitting multicast scheduling information that indicates acknowledgment/negative-acknowledgment (ACK/NACK) feedback is to be provided for the multicast data communications, and wherein the feedback configuration further indicates that the subset of feedback processes have the multicast-only configuration; and
transmitting, responsive the feedback report including a NACK indication for the first feedback process, a retransmission of the first multicast data communication, wherein the retransmission is transmitted in a point-to-point transmission from the access network entity to the first UE that indicates a first feedback process identification that is associated with the first feedback process.

17. The method of claim 15, further comprising:
transmitting multicast scheduling information that indicates acknowledgment/negative-acknowledgment (ACK/NACK) feedback is to be provided for the multicast data communications, and wherein the feedback configuration further indicates that the subset of feedback processes have the multicast-or-unicast configuration.

18. The method of claim 17, further comprising:
transmitting, responsive the feedback report including a NACK indication for the first feedback process, a retransmission of the first multicast data communication, wherein the retransmission is transmitted in a point-to-point transmission from the access network entity to the first UE that indicates a first feedback process identification that is associated with the first feedback process, and wherein the point-to-point transmission further indicates whether the retransmission is associated with a multicast data transmission or a unicast data transmission.

19. The method of claim 18, wherein the point-to-point transmission includes a control information field, or is transmitted in a scheduling window, that indicates whether the retransmission is associated with the multicast data transmission or the unicast data transmission.

20. The method of claim 15, further comprising:
transmitting multicast scheduling information that indicates no-feedback or negative-acknowledgment-only (NACK-only) feedback is to be provided for the multicast data communications, and wherein the subset of feedback processes have the multicast-or-unicast configuration based at least in part on the no-feedback or NACK-only feedback for the multicast data communications.

21. The method of claim 15, wherein the feedback configuration is transmitted in one or more of radio resource control signaling, a medium access control (MAC) control element, a group common downlink control information (GC-DCI), or any combinations thereof, as an explicit indication of the multicast-only configuration or the multicast-or-unicast configuration for each feedback process of at least the subset of feedback processes.

22. The method of claim 15, wherein the feedback configuration is based on an implicit indication provided by a feedback timing value, a control channel resource indicator value for providing the feedback report, a radio network temporary identifier (RNTI) associated with control information that schedules the first multicast data communication, or any combinations thereof.

23. The method of claim 15, wherein the feedback report includes a feedback codebook that includes a set of bits that are associated with a plurality of reception candidate occasions and wherein, when the subset of feedback processes have the multicast-only configuration, each reception candidate occasion of the plurality of reception candidate occasions is included in the feedback codebook.

24. The method of claim 15, wherein the feedback report includes a feedback codebook that includes a set of bits that are associated with a plurality of reception candidate occasions and wherein, when the subset of feedback processes have the multicast-or- unicast configuration and feedback for the multicast data communications are disabled or are negative-acknowledgment-only (NACK-only), the feedback codebook includes bits for one or more of the plurality of reception candidate occasions based at least in part on a type of feedback codebook that is configured for providing the feedback report.

25. An apparatus for wireless communications at a first user equipment (UE), comprising:
a processor;
memory coupled with the processor; and
instructions stored in the memory and executable by the processor to cause the apparatus to:
receive a feedback report configuration that indicates, for at least a subset of a set of feedback processes, a type of feedback that is to be reported for each feedback process of the subset of feedback processes;
determine, based at least in part on the feedback report configuration, whether a first feedback process of the subset of feedback processes has a multicast-only configuration wherein the first feedback process can be applied at the UE for only multicast data communications, or whether the first feedback process has a multicast-or- unicast configuration wherein the first feedback process can be applied at the UE for either multicast data communications or for unicast data communications but not for both multicast data communications and unicast data communications concurrently; and
decode one or more transmissions associated with the first feedback process based at least in part on whether the first feedback process has the multicast-only configuration or the multicast-or-unicast configuration.

26. The apparatus of claim 25, wherein the instructions to determine are executable by the processor to cause the apparatus to:
determine that the first feedback process has the multicast-only configuration based at least in part on the first feedback process being associated with multicast data communications and the feedback report configuration indicating acknowledgment/negative- acknowledgment (ACK/NACK) feedback is to be provided for the first feedback process.

27. The apparatus of claim 26, wherein the instructions are further executable by the processor to cause the apparatus to:
receive, responsive to a NACK feedback provided for the first feedback process, a retransmission of a first multicast data communication associated with the first feedback process in a point-to-point (PTP) communication, wherein PTP communications for unicast data do not use a feedback process identification associated with the first feedback process.

28. The apparatus of claim 25, wherein the instructions to determine are executable by the processor to cause the apparatus to:
determine that the first feedback process has the multicast-or-unicast configuration based at least in part on the feedback report configuration indicating acknowledgment/negative-acknowledgment (ACK/NACK) feedback is to be provided for the multicast data communications.

29. The apparatus of claim 25, wherein the instructions are further executable by the processor to cause the apparatus to:
receive multicast scheduling information that indicates no-feedback or negative-acknowledgment-only (NACK-only) feedback is to be provided for multicast data transmissions, and wherein the subset of feedback processes have the multicast-or-unicast configuration based at least in part on the no-feedback or NACK-only feedback for the multicast data transmissions.

30. The apparatus of claim 29, wherein a same feedback process identification as used for a first multicast data transmission in a point-to-multipoint (PTM) transmission is included in scheduling information for a unicast data transmission in a point-to-point (PTP) transmission from an access network entity.

31. A method for wireless communications at a first user equipment (UE), comprising:
receiving a feedback report configuration that indicates, for at least a subset of a set of feedback processes, a type of feedback that is to be reported for each feedback process of the subset of feedback processes, wherein the type of feedback is based at least in part on whether a unicast or a multicast communication is associated with the respective feedback process;
determining, based at least in part on the feedback report configuration, that a first feedback process of the subset of feedback processes has a multicast-only configuration based at least in part on the first feedback process being associated with only multicast data communications; and
processing one or more transmissions associated with the first feedback process based at least in part on the feedback report configuration indicating acknowledgment/negative- acknowledgment (ACK/NACK) feedback is to be provided for the first feedback process.

32. An apparatus for wireless communications at a first user equipment (UE), comprising:
a processor;
memory coupled with the processor; and
instructions stored in the memory and executable by the processor to cause the apparatus to:
receive a feedback report configuration that indicates, for at least a subset of a set of feedback processes, a type of feedback that is to be reported for each feedback process of the subset of feedback processes, wherein the type of feedback is based at least in part on whether a unicast or a multicast communication is associated with the respective feedback process;

determine, based at least in part on the feedback report configuration, that a first feedback process of the subset of feedback processes has a multicast-only configuration based at least in part on the first feedback process being associated with only multicast data communications; and process one or more transmissions associated with the first feedback process based at least in part on the feedback report configuration indicating acknowledgment/negative-acknowledgment (ACK/NACK) feedback is to be provided for the first feedback process.

33. A method for wireless communications at an access network entity, comprising:

transmitting, to a first user equipment (UE), a feedback configuration for a set of feedback processes that indicates, for at least a subset of the set of feedback processes, a multicast-only configuration or a multicast-or-unicast configuration, wherein the multicast-only configuration indicates that one or more feedback processes of the subset of feedback processes correspond to only multicast data communications, and wherein the multicast-or-unicast configuration indicates that one or more feedback processes of the subset of feedback processes correspond to either multicast data communications or unicast data communications but not to both multicast data communications and unicast data communications concurrently;

transmitting a first multicast data communication to the first UE and at least one or more other UEs, the first multicast data communication associated with a first feedback process of the subset of feedback processes, the first feedback process having a multicast-only configuration; and receiving, from the first UE, a feedback report based at least in part on the feedback configuration indicating acknowledgment/negative-acknowledgment (ACK/NACK) feedback is to be provided for the first feedback process.

34. An apparatus for wireless communications at an access network entity, comprising:

a processor;

memory coupled with the processor; and instructions stored in the memory and executable by the processor to cause the apparatus to:

transmit, to a first user equipment (UE), a feedback configuration for a set of feedback processes that indicates, for at least a subset of the set of feedback processes, a multicast-only configuration or a multicast-or-unicast configuration, wherein the multicast-only configuration indicates that one or more feedback processes of the subset of feedback processes correspond to only multicast data communications, and wherein the multicast-or-unicast configuration indicates that one or more feedback processes of the subset of feedback processes correspond to either multicast data communications or unicast data communications but not to both multicast data communications and unicast data communications concurrently;

transmit a first multicast data communication to the first UE and at least one or more other UEs, the first multicast data communication associated with a first feedback process of the subset of feedback processes, the first feedback process having a multicast-only configuration; and receive, from the first UE, a feedback report based at least in part on the feedback configuration indicating acknowledgment/negative-acknowledgment (ACK/NACK) feedback is to be provided for the first feedback process.

* * * * *